US008995360B2

(12) United States Patent
Erichsen et al.

(10) Patent No.: US 8,995,360 B2
(45) Date of Patent: Mar. 31, 2015

(54) TECHNIQUES FOR PREFIX SUBNETTING

(75) Inventors: Kirk Erichsen, Greenwood Village, CO (US); Lee Howard, Fairfax, VA (US); Ken Gould, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 965 days.

(21) Appl. No.: 13/157,285

(22) Filed: Jun. 9, 2011

(65) Prior Publication Data

US 2012/0314617 A1      Dec. 13, 2012

(51) Int. Cl.
| *H04W 4/00* | (2009.01) |
| *H04L 12/66* | (2006.01) |
| *H04L 12/28* | (2006.01) |
| *H04L 29/12* | (2006.01) |

(52) U.S. Cl.
CPC ........ *H04L 12/2834* (2013.01); *H04L 61/6059* (2013.01); *H04L 61/6068* (2013.01); *H04L 61/6004* (2013.01); *H04L 12/2801* (2013.01); *H04L 12/2898* (2013.01); *H04L 61/2015* (2013.01); *H04L 61/2514* (2013.01)
USPC ........... 370/329; 370/338; 370/356; 370/392; 370/401

(58) Field of Classification Search
CPC ................ H04L 29/12283; H04L 29/12915; H04L 61/2061; H04L 61/6059; H04L 63/0428; H04L 69/161; H04L 69/167; H04L 29/12009; H04L 29/12207; H04L 29/12933; H04L 61/6077; H04L 45/04; H04W 48/14; H04W 8/18
See application file for complete search history.

(56) References Cited

U.S. PATENT DOCUMENTS

| 7,039,035 B2* | 5/2006 | Droms et al. ................. 370/338 |
| 7,895,642 B1* | 2/2011 | Larson et al. ..................... 726/3 |
| 8,301,738 B1* | 10/2012 | Alex .............................. 709/222 |
| 8,681,695 B1* | 3/2014 | Krishnan ....................... 370/328 |
| 2002/0083198 A1* | 6/2002 | Kim et al. ...................... 709/245 |
| 2003/0053441 A1* | 3/2003 | Banerjee ........................ 370/352 |
| 2003/0056217 A1 | 3/2003 | Brooks |
| 2003/0182445 A1* | 9/2003 | Smith et al. ................... 709/238 |
| 2004/0139187 A1* | 7/2004 | Park ............................... 709/223 |
| 2004/0179539 A1* | 9/2004 | Takeda et al. ................. 370/401 |

(Continued)

OTHER PUBLICATIONS

Anonymous, Ripe NPC IPv6 chart, downloaded from http://www.ripe.net/training/material/LIR-Training-Course/LIR-Training-Handbook-Appendices/CEDR-Chart-IPv6.pdf, May 20, 2011.

(Continued)

*Primary Examiner* — Melanie Jagannathan
(74) *Attorney, Agent, or Firm* — Otterstedt, Ellenbogen & Kammer, LLP

(57) ABSTRACT

A delegated internet protocol version six prefix, which is assigned to a gateway device which is interposed between an internet and a premises, is divided into a lower-numbered portion and a higher-numbered portion. One of the portions is allocated to a plurality of networks associated with the premises. The other is broken into a plurality of blocks for use in prefix delegation for allocation to routers associated with the premises requesting the prefix delegation. The gateway device is operated in accordance with the dividing, allocating, and breaking steps. Optionally, at least some of the plurality of networks associated with the premises are pre-categorized into at least first and second trust zones, and the operating step further includes operating the gateway device in accordance with the pre-categorizing step. Apparatuses, devices, computer program products, and internet protocol version four embodiments are also provided.

25 Claims, 12 Drawing Sheets

(56) References Cited

U.S. PATENT DOCUMENTS

| | | | |
|---|---|---|---|
| 2006/0013193 A1* | 1/2006 | Kim et al. | 370/351 |
| 2006/0140165 A1* | 6/2006 | Koodli et al. | 370/338 |
| 2006/0221921 A1* | 10/2006 | Kniveton | 370/338 |
| 2006/0271682 A1* | 11/2006 | Choo et al. | 709/226 |
| 2007/0217436 A1 | 9/2007 | Markley et al. | |
| 2008/0263353 A1* | 10/2008 | Droms et al. | 713/153 |
| 2009/0248794 A1 | 10/2009 | Helms | |
| 2010/0313236 A1 | 12/2010 | Straub | |
| 2011/0228734 A1* | 9/2011 | Laganier et al. | 370/329 |
| 2012/0314705 A1 | 12/2012 | Howard | |

OTHER PUBLICATIONS

Wikipedia, IPv6, downloaded from http://en.wikipedia.org/wiki/IPv6 on Mar. 24, 2011.

Wikipedia, Network address translation, downloaded from http://en.wikipedia.org/wiki/Network_address_translation on Mar. 24, 2011.

Wikipedia, IPv4, downloaded from http://en.wikipedia.org/wiki/IPv4 on Mar. 24, 2011.

Wikipedia, Internet Protocol, downloaded from http://en.wikipedia.org/wiki/Internet_Protocol on Mar. 24, 2011.

Wikipedia, IPv6 address, downloaded from http://en.wikipedia.org/wiki/IPv6_address on Mar. 24, 2011.

Wikipedia, Service set (802.11 network), downloaded from http://en.wikipedia.org/wiki/Service_set_(802.11_network) on Mar. 24, 2011.

Wikipedia, Firewall (computing), downloaded from http://en.wikipedia.org/wiki/Firewall_(computing) on Mar. 24, 2011.

Anonymous, Linux Reviews, Why you want IPv6, downloaded from http://en.linuxreviews.org/Why_you_want_IPv6 on Mar. 24, 2011.

* cited by examiner

FIG. 4
PRIOR ART

| PREFIX | /48s | /56s | /64s | BITS |
|---|---|---|---|---|
| /24 | 16M | 4G | 1T | 104 |
| /25 | 8M | 2G | 512G | 103 |
| /26 | 4M | 1G | 256G | 102 |
| /27 | 2M | 512M | 128G | 101 |
| /28 | 1M | 256M | 64G | 100 |
| /29 | 512K | 128M | 32G | 99 |
| /30 | 256K | 64M | 16G | 98 |
| /31 | 128K | 32M | 8G | 97 |
| /32 | 64K | 16M | 4G | 96 |
| /33 | 32K | 8M | 2G | 95 |
| /34 | 16K | 4M | 1G | 94 |
| /35 | 8K | 2M | 512M | 93 |
| /36 | 4K | 1M | 256M | 92 |
| /37 | 2K | 512K | 128M | 91 |
| /38 | 1K | 256K | 64M | 90 |
| /39 | 512 | 128K | 32M | 89 |
| /40 | 256 | 64K | 16M | 88 |
| /41 | 128 | 32K | 8M | 87 |
| /42 | 64 | 16K | 4M | 86 |
| /43 | 32 | 8K | 2M | 85 |
| /44 | 16 | 4K | 1M | 84 |
| /45 | 8 | 2K | 512K | 83 |
| /46 | 4 | 1K | 256K | 82 |
| /47 | 2 | 512 | 128K | 81 |
| /48 | 1 | 256 | 64K | 80 |
| /49 | | 128 | 32K | 79 |
| /50 | | 64 | 16K | 78 |
| /51 | | 32 | 8K | 77 |
| /52 | | 16 | 4K | 76 |
| /53 | | 8 | 2K | 75 |
| /54 | | 4 | 1K | 74 |
| /55 | | 2 | 512 | 73 |
| /56 | | 1 | 256 | 72 |
| /57 | | | 128 | 71 |
| /58 | | | 64 | 70 |
| /59 | | | 32 | 69 |
| /60 | | | 16 | 68 |
| /61 | | | 8 | 67 |
| /62 | | | 4 | 66 |
| /63 | | | 2 | 65 |
| /64 | | | 1 | 64 |

IPv6 CHART
K=1,024
M=1,048,576
G=1,073,741,824
T=1,099,511,627,776

TECHNIQUES FOR PREFIX SUBNETTING

FIELD OF THE INVENTION

The present invention relates generally to the electrical, electronic, and computer arts, and more particularly relates to network technology and the like.

BACKGROUND OF THE INVENTION

The great majority of the Internet currently utilizes Internet Protocol Version 4 (IPv4). The address space in IPv4 is becoming exhausted. The eventual exhaustion of the IPv4 address space was recognized some time ago and a common technique of dealing with it was developed. This technique employs network address translation (NAT) wherein a number of private IPv4 addresses, such as within a home or small business network, "hide" behind a single public IPv4 address.

Currently, residences and small businesses obtain access to the Internet via a number of techniques. One example is by subscribing through a cable multiple system operator (MSO); such an MSO may provide a variety of services such as broadcast television, Video-On-Demand (VOD), broadband data services, IP telephony, and the like.

In this regard, with the advent of digital communications technology, many TV program streams are transmitted in digital formats. For example, Digital Satellite System (DSS). Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

SUMMARY OF THE INVENTION

Techniques are provided for prefix subnetting.

In one aspect, an exemplary method includes the steps of dividing a delegated internet protocol version six prefix, which is assigned to a gateway device which is interposed between an internet and a premises, into a lower-numbered portion and a higher-numbered portion; allocating one of the lower-numbered portion and the higher-numbered portion to a plurality of networks associated with the premises; breaking another one of the lower-numbered portion and the higher-numbered portion into a plurality of blocks for use in prefix delegation for allocation to routers associated with the premises requesting the prefix delegation; and operating the gateway device in accordance with the dividing, allocating, and breaking steps.

In another aspect, another exemplary method includes the steps of obtaining an internet protocol version four public address associated with a gateway device which is interposed between an internet and a premises; and, in accordance with predetermined rules, dividing a private address space for the premises into at least: a first subdivision for at least one of a wired sub-network, a wireless sub-network, and a multimedia over coaxial cable interface; and a second subdivision for at least another one of the wired sub-network, the wireless sub-network, and the multimedia over coaxial cable interface. Further steps include assigning a first trust value to at least a portion of the first subdivision and a second trust value to at least a portion of the second subdivision in accordance with the predetermined rules; and operating the gateway device in accordance with the obtaining, dividing, and assigning steps.

In still another aspect, a gateway device is provided for interposition between an internet and a premises. The gateway device includes a memory and at least one processor, which is coupled to the memory, and operative to carry out or otherwise facilitate performance of one or more method steps.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including, for example:

ability to provide individual networks to every potential device within the premises (as opposed to merely individual addresses);

creation of security realms wherein different parts of the network are segmented from each other; and avoid need to use NAT.

These and other features and advantages of the invention will become apparent from the following detailed description of illustrative embodiments thereof, which is to be read in connection with the accompanying drawings.

BRIEF DESCRIPTION OF THE DRAWINGS

FIG. 4 is a table depicting the number of /64 networks corresponding to each of a plurality of prefix lengths, as known in the prior art;

DETAILED DESCRIPTION OF PREFERRED EMBODIMENTS

Embodiments of the invention may be employed in a variety of settings. A non-limiting exemplary embodiment will be described within the context of a content-based network.

Figure 1:
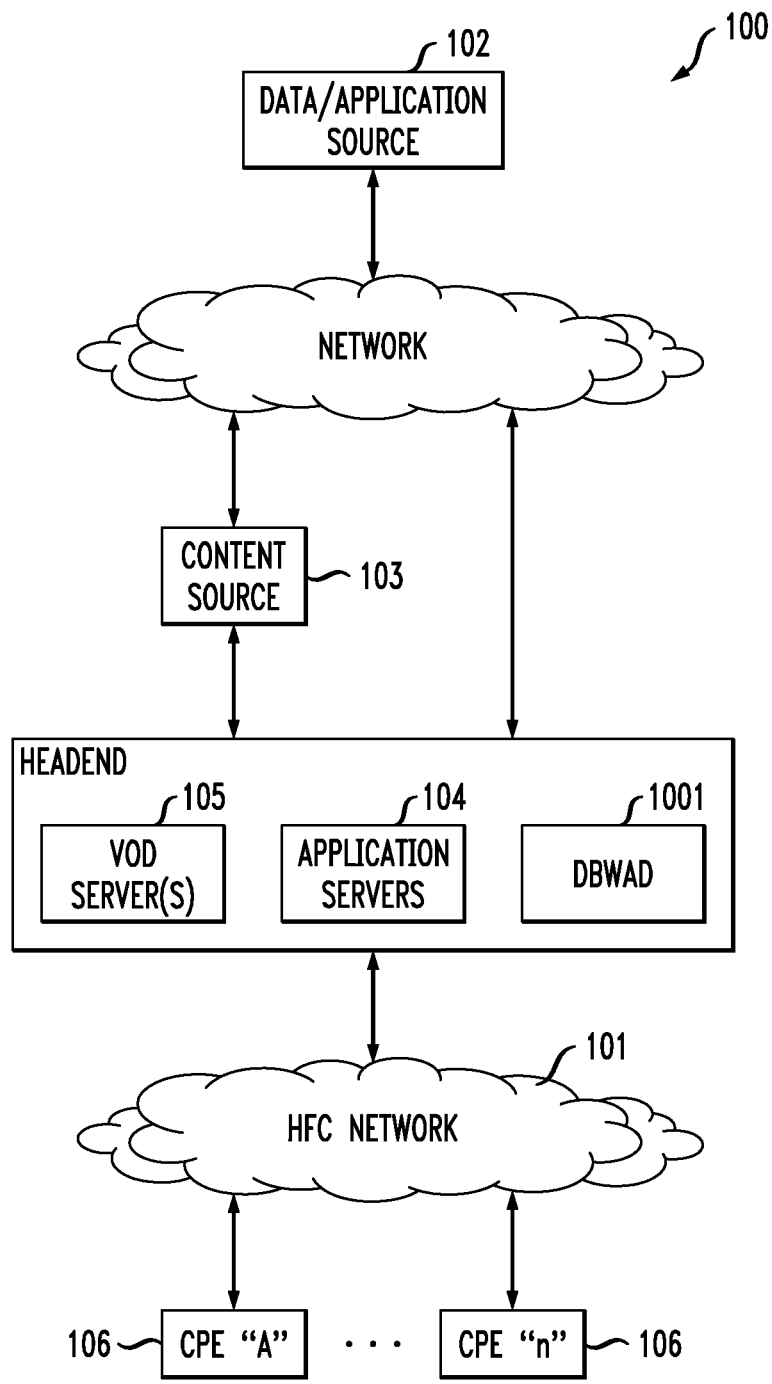
FIG. 1 is a functional block diagram illustrating an exemplary hybrid fiber-coaxial (HFC) network configuration.

FIG. 1 illustrates a typical content-based network configuration 100. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. In a preferred approach, at least some of the CPE 106 are advanced wireless gateway apparatuses as described hereinafter and shown in FIGS. 2 and 3. Also included is a dynamic bandwidth allocation device (DBWAD) 1001 such as a global session resource manager, which is itself a non-limiting example of a session resource manager. The distribution server(s) 104, VOD servers 105, DBWAD 1001, and CPE(s) 106 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1A (described in greater detail below) may be used.

It should be noted at this point that in addition to a conventional HFC network or a switched digital network, other kinds of video content networks can be employed for network 101 (e.g., fiber-to-the-home (FTTH) or fiber-to-the-curb (FTTC); digital subscriber line (DSL); wireless networks such as Wi-Fi, WiMAX (Worldwide Interoperability for Microwave Access), 3GPP Long Term Evolution (LTE), various 4G standards; and the like). Again, for the avoidance of doubt, the HFC network details set forth herein are merely provided to show one non-limiting exemplary environment and it is to be emphasized that embodiments of the invention can be employed in many different situations where a gateway device or the like is interposed between: (i) the Internet or another internet; and (ii) a premises or the like.

The data/application origination point 102 comprises any medium that allows data and/or applications (such as a VOD-based or "Watch TV" application) to be transferred to a distribution server 104 (for example, over a suitable network, not separately numbered). This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like. As noted above, in a preferred approach, at least some of the CPE 106 are advanced wireless gateway apparatuses as described hereinafter and shown in FIGS. 2 and 3.

Figure 1A:
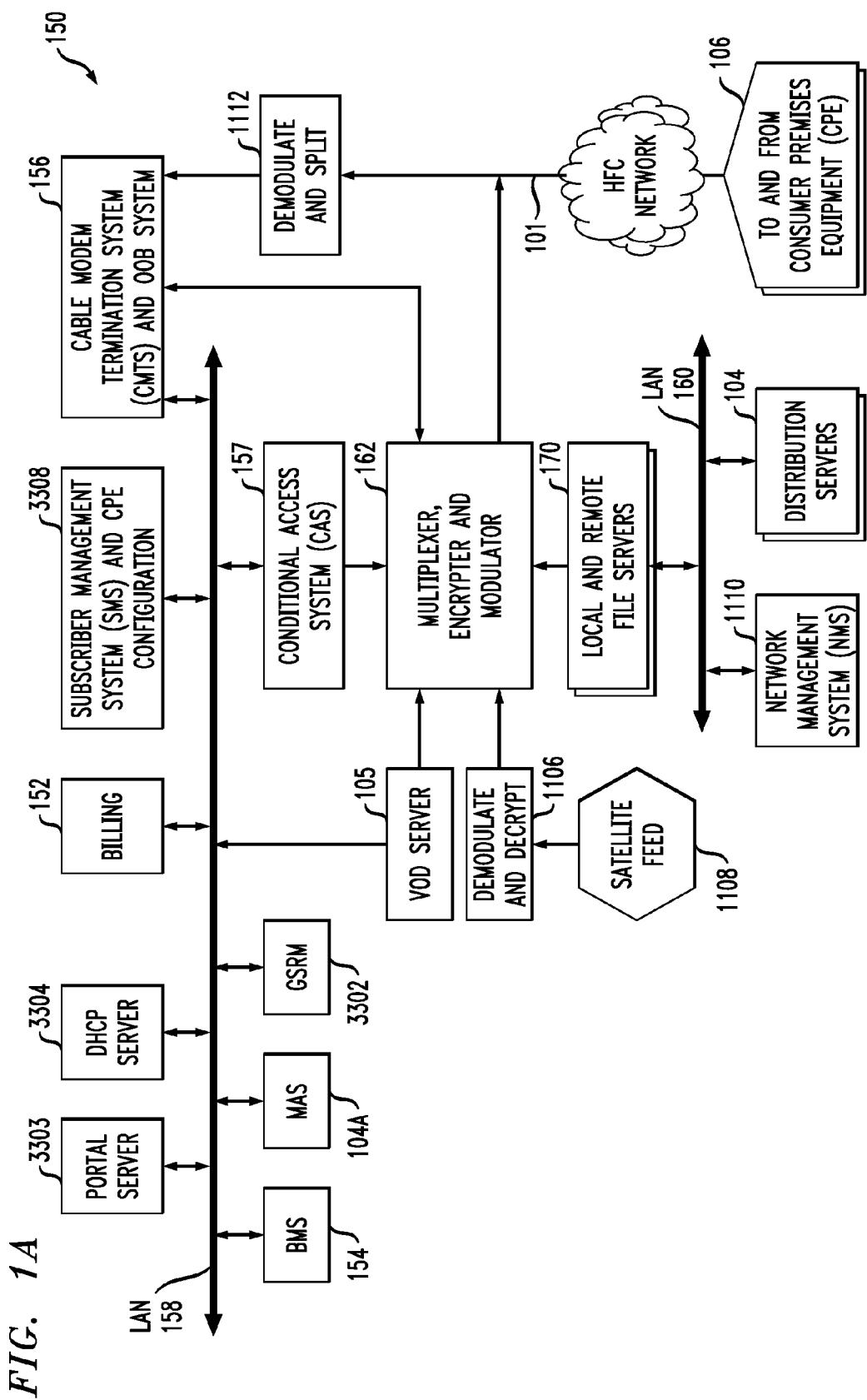
FIG. 1A is a functional block diagram illustrating one exemplary HFC cable network head-end configuration.

Referring now to FIG. 1A, one exemplary embodiment of a head-end architecture is described. As shown in FIG. 1A, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1A is high-level, conceptual architecture and that each multi-service operator or multiple system operator (MSO) may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1B) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville, Colo. 80027, USA) and associated protocols (e.g., DOCSIS 1.x, 2.0, or 3.0). The OpenCable™ Application Platform. (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes. Other pertinent materials include the Data-Over-Cable Service Interface Specifications, IPv4 and IPv6 eRouter Specification (version 1.0 and any other versions), CM-SP-eRouter-105-110210, and the Data-Over-Cable Service Interface Specifications, DOCSIS Set-top Gateway (DSG) Interface Specification, CM-SP-DSG-117-110210, both available from Cable Television Laboratories, Inc., and both expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 1A are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

Figure 1B:
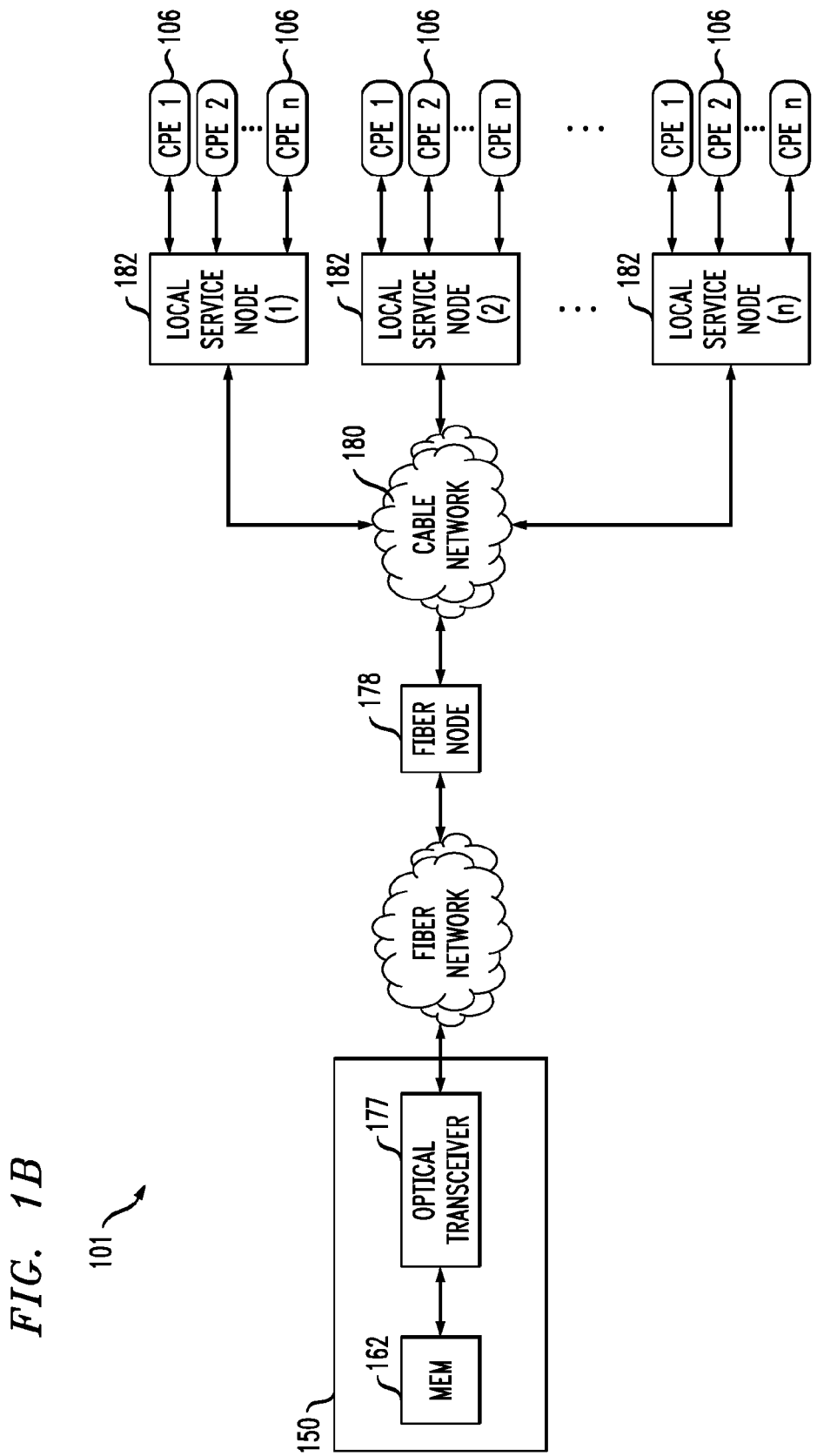
FIG. 1B is a functional block diagram illustrating one exemplary local service node configuration.

As shown in FIG. 1B, the network 101 of FIGS. 1 and 1A comprises a fiber/coax arrangement wherein the output of the MEM 162 of FIG. 1A is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

Note that reference is made herein, for brevity, to features of the "Brooks invention"—it should be understood that no inference should be drawn that such features are necessarily present in all claimed embodiments of Brooks.

The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 2:
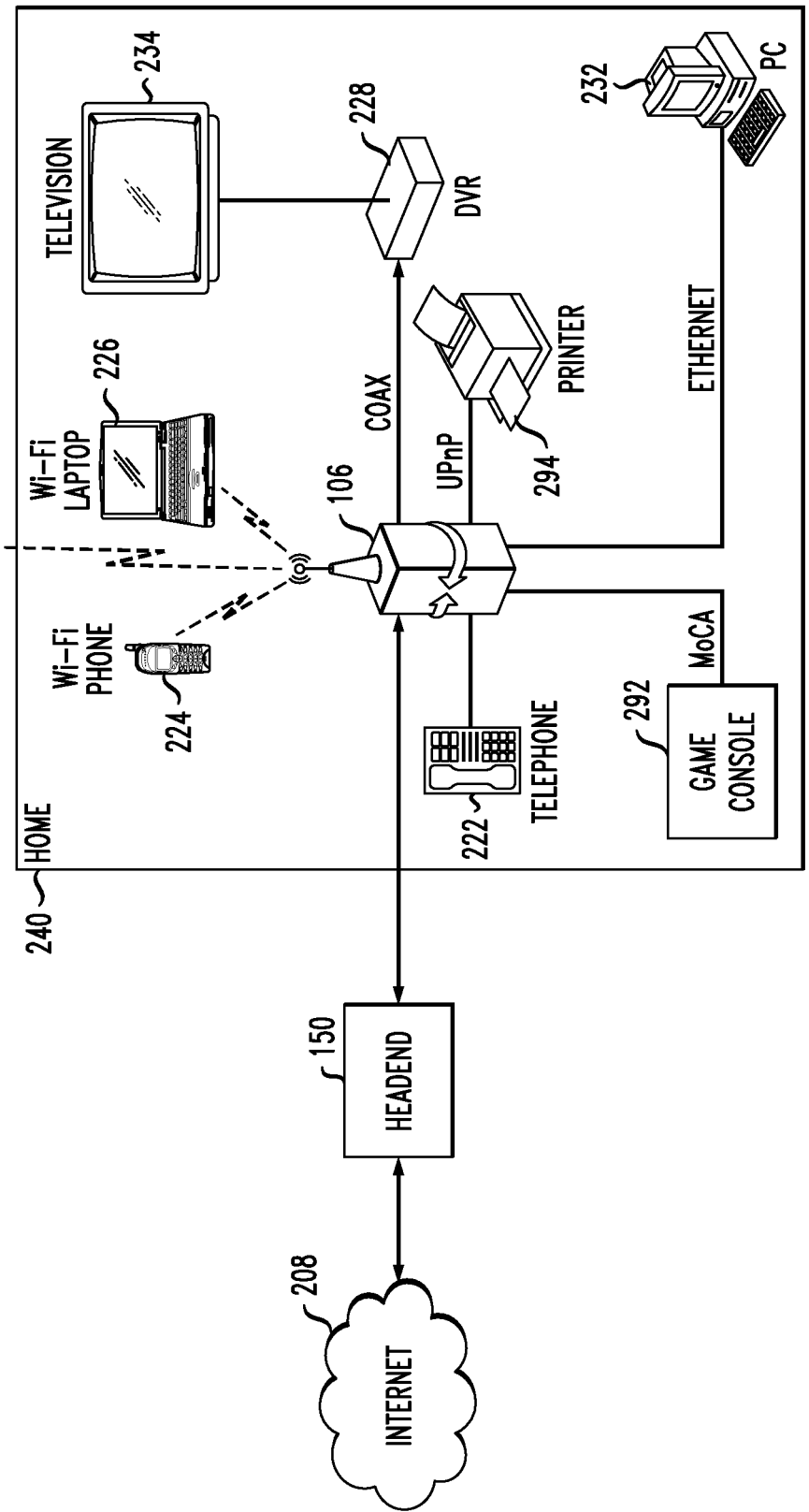
FIG. 2 is a functional block diagram of a content and data distribution network configured in accordance with one embodiment of the invention.

Reference should now be had to FIG. 2, which presents a block diagram of a premises network interfacing with a head end of an MSO or the like, providing Internet access. An exemplary advanced wireless gateway comprising CPE 106, incorporating aspects of the invention, is depicted as well.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

CPE 106 is also in signal communication with one or more roaming devices, generally represented by block 290. Communication with such devices will be discussed in greater detail below.

A home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic, digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 2. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

Figure 3:
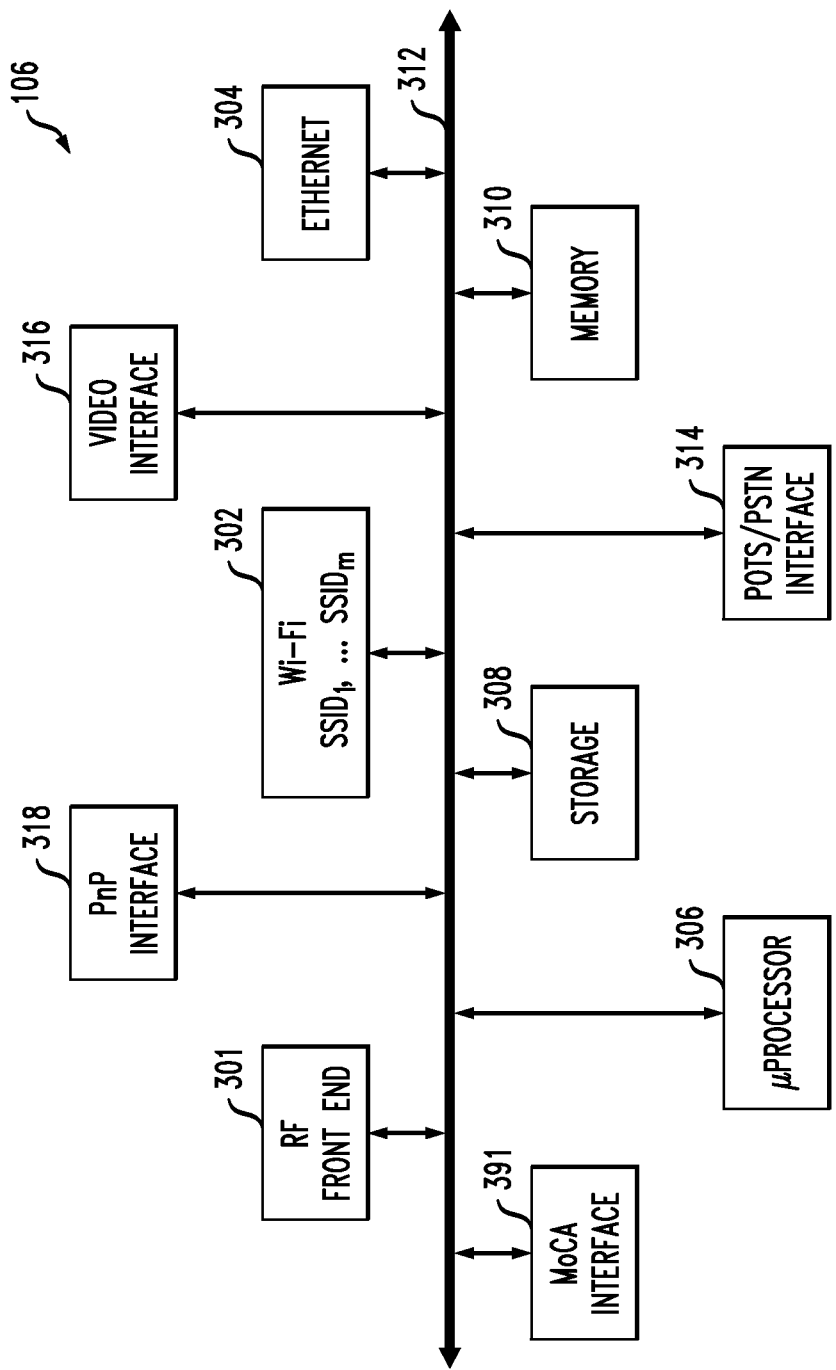
FIG. 3 is a functional block diagram of an exemplary centralized CPE unit configured in accordance with one embodiment of the invention.

FIG. 3 is a block diagram of one exemplary embodiment of the CPE 106 of FIG. 2. The exemplary CPE 106 includes an RF front end 301, Wi-Fi interface 302, video interface 316, "Plug n' Play" (PnP) interface 318 (for example, a UPriP interface) and Ethernet interface 304, each directly or indirectly coupled to a bus 312. As will be discussed further below, in one or more embodiments, Wi-Fi interface 302 comprises a single wireless access point (WAP) running multiple ("m") service set identifiers (SSIDs). For the avoidance of doubt, in one or more embodiments, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Every embodiment need not necessarily have all the elements shown in FIG. 3.

It will be recognized that while a linear or centralized bus architecture is shown as the basis of the exemplary embodiment of FIG. 3, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the CPE configuration shown is essentially for illustrative purposes, and various other configurations of the CPE 106 are consistent with other embodiments of the invention. For example, the CPE 106 in FIG. 3 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 3; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In this fashion, content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

It will be appreciated, however, that the RF front end 301 of the CPE may comprise (either in addition to or in place of the cable modem) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 2 and 3 acts as a Wi-Fi access point (AP), thereby allowing Wi-Fi enabled devices to connect to the home network and access Internet, media, and other resources on the network.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision die CPE 106 from the cable head-end 150 or other remote network node via the cable modem (DOCSIS) interface. This control allows a remote user to configure and monitor the CPE 106 and home network.

The MoCA interface 391 can include, for example, a MoCA, retail compliant F-connector for providing data over coax capability. The exemplary MoCA port operates in the 1125-1525 MHz band, although other frequencies (MoCA compliant or otherwise) may be used for this purpose if desired. The MoCA frequencies can be multiplexed onto the cable input port of the CPE 106, or sent over another channel (e.g., dedicated channel or interface). The CPE 106 also optionally includes a switched packet interface between the Ethernet port and the MoCA interface. In one embodiment, data traffic flows through the CPE 106 between the Ethernet or other network interface and MoCA ports. In some cases, this occurs without requiring host processor intervention; in other instances, host processor intervention is a possibility.

As discussed above, the exemplary Wi-Fi wireless interface 302 is also configured to provide a plurality of unique service set identifiers (SSIDs) simultaneously. These SSIDs are configurable (locally or remotely), such as via a web page.

As alluded to elsewhere herein, in a non-limiting exemplary embodiment, one or more techniques for prefix subnetting are implemented in the context of an advanced wireless gateway (AWG). As also discussed elsewhere herein, the IPv4 address space is becoming exhausted. One or more embodiments allow an entity such as an MSO or other Internet Service Provider (ISP) to reduce, for its customers, the amount of operational overhead in deploying IPv6. In one or more embodiments, a prefix, which is essentially a block in the IPv6 address the MSO or other ISP assigns to a customer, is then broken down into individual networks which are then assigned to the individual network interfaces such as, by way of example and not limitation, a four port Ethernet switch, a Multimedia over Coax Alliance (MoCA) interface, and one of four wireless service set identifiers (SSIDs), each of which have their own IP subnet. In one or more embodiments, the subnetting techniques advantageously simplify:

how to deal with a request for a prefix,
how it is assigned to the actual gateway or similar device,
setting up a default configuration that has a high probability of working the majority of the time for most use cases, and
how the sub-nets are broken down individually, even in support of additional routers within the home, small business, or the like, which is called sub-prefix delegation.

An IPv6 Network is a fixed /64 size including $2^{64}$ (18,446,744,073,709,551,616) IPv6 addresses. FIG. 4 shows the number of /64 networks to each of the listed prefix lengths. As depicted therein, the following prefixes have the following meanings:

K=1,024
M=1,048,576
G=1,073,741,824
T=1,099,511,627,776

The notation "/" refers to the number of bits in the given prefix. That is, the size of a block of addresses is indicated by a slash (/) and the decimal size of the network prefix; the specific addresses in the block are not explicitly specified in this approach. For example, an address block with 48 bits in the prefix is indicated by /48. Such a block contains $2^{128-48}=2^{80}$ addresses. The smaller the numerical value of the network prefix, the larger the size of the block, since the prefix is subtracted from 128 to obtain the exponent to which two is raised to determine the number of available addresses. For example, a /56 prefix is four times larger than a /58 prefix ($2^{128-56}=2^{72}$ addresses; $2^{128-58}=2^{70}$ addresses; $2^{72}=2^{70} \times 4$).

The skilled artisan will be familiar with IPv4 and IPv6 per se. IPv6 specifies a new packet format, designed to minimize packet header processing by routers. IPv6 includes a larger address space, enhanced multi-casting, stateless address auto-configuration (SLAAC), mandatory support for network layer security, simplified processing by routers, enhanced mobility, options extensibility, and support for so-called "jumbograms."

In order to support future prefix sub-delegation and hierarchal prefix delegation, a typical site prefix length of /56 can be further broken down to produce equal size blocks of which half may be used for sub-prefixes within the LAN with which to create additional layers in the topology.

In a non-limiting example, an advanced wireless gateway or similar device 106 includes five SSIDs (m=5, two trusted, three un-trusted); one trusted wired Ethernet LAN segment and one trusted MoCA interface.

Figure 5:
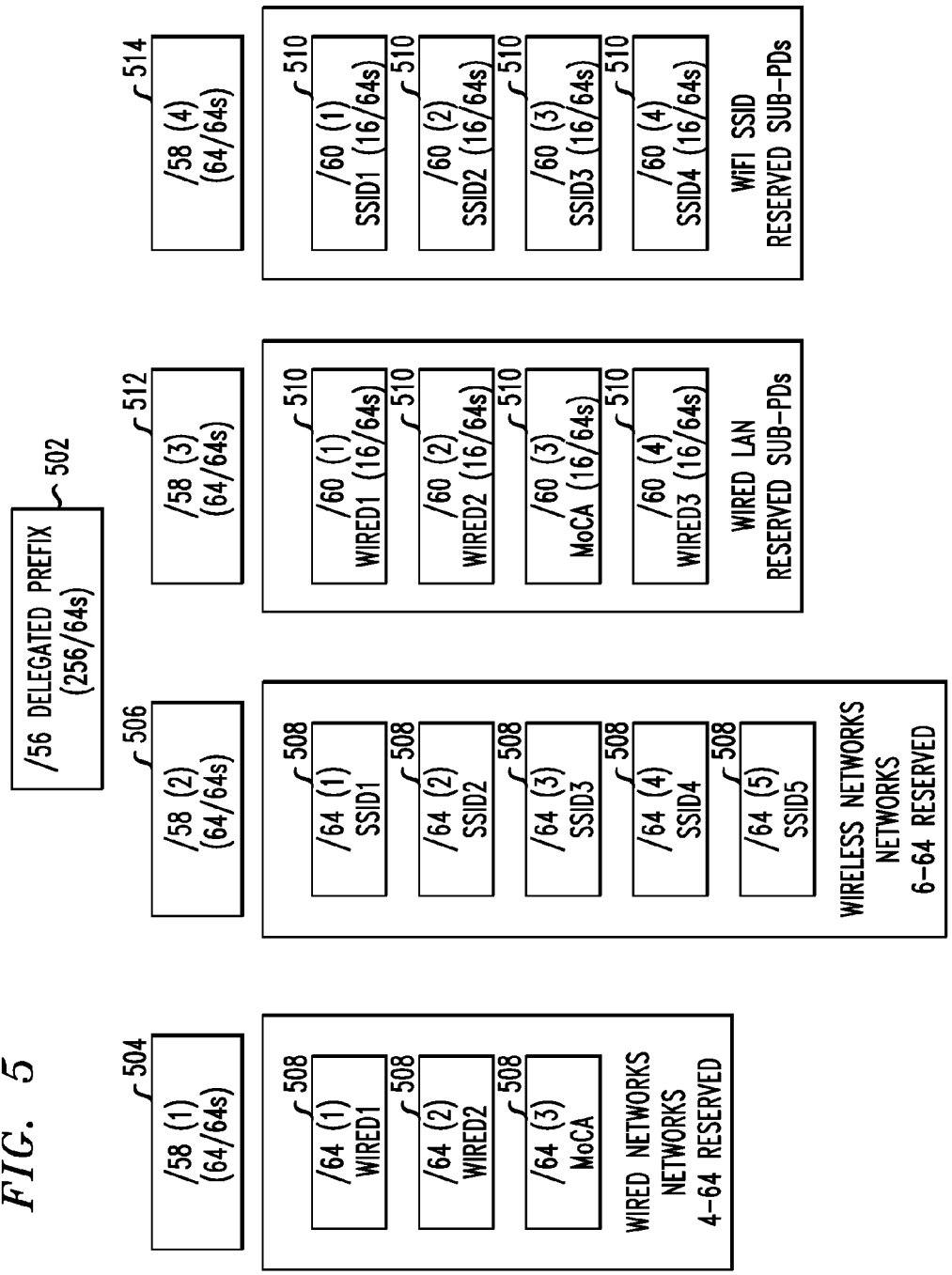
FIG. 5 shows a first exemplary /56 option for network allocation and sub-prefix delegation, according to an aspect of the invention.

Using FIG. 4, and with reference also to FIG. 5, it can be seen that breaking a /56 prefix 502 into four equal /58 networks yields the following:

Two (2)/58 prefixes 504, 506 broken into 128/64s 508 to address trusted and un-trusted networks; and
Eight (8)/60 sub-prefixes 510 for Sub-Prefix Delegation/Hierarchal Prefix Delegation (16/64 networks each)

Still with reference to FIG. 5, a /56 equals 256/64 networks, with the four /58 prefixes (previously-mentioned 504 and 506 as well as 512, 514 with the eight /60 sub-prefixes underneath) broken out providing 64/64 networks each, further subdivided into eight /60 prefixes labeled 510, with 16/64 networks, each with room to grow (network depth and network width). Thus, to summarize, a /56 delegated prefix length 502 allows for 256/64 networks. In the example of FIG. 5, the /56 prefix is broken into four equal /58 prefixes 504, 506, 512, 514. The first of these, 504, is broken into 64 equal /64 networks 508, including in this case wired networks, such as Wired1 and Wired2, and a MoCA network. In the non-limiting example, wired networks 4-64 are reserved. The second /58 network is also broken into 64 equal /64 networks 508, including in this case wireless networks, such as SSID1 through SSID5. In the non-limiting example, wireless networks 6-64 are reserved. The third /58 network 512 is broken into four /60 sub-prefixes 510 for a wired LAN, while the fourth /58 network 514 is broken into four /60 sub-prefixes 510 for WiFi SSIDs.

FIG. 5 thus depicts exemplary LAN Interfaces and PD Pools. The exemplary advanced wireless gateway or similar device can supply 128/64 networks to trusted and un-trusted wired and wireless clients. In a non-limiting example, for a first phase of deployment, use of sub-prefix delegation can be disabled and LAN clients may well use stateless address auto-configuration (SLAAC) vs. stateful DHCPv6 (dynamic host control protocol version 6). Many instances will involve a single router per home and/or office. In a later phase, sub-PD will be enabled. In one or more embodiments, the gateway router may "hint" between /64 and /48, however, the advanced wireless gateway or similar device will ignore these hints and provide a /60 instead.

One or more embodiments also employ the notion of trust relationships. In this regard, there is a zone which is on the outside of the advanced wireless gateway or similar device which is open to the Internet (which is called "un-trusted"), and anything on the inside of the advanced wireless gateway or similar device is called "trusted." In this aspect, wireless SSIDs that are not intended to be used by the general public like a wireless hot spot environment are secure and considered trusted. On the other hand, a wireless SSID that is associated with a public hot spot presence is un-trusted, as is a DMZ interface (demilitarized zone that a customer could use to provide a publicly facing Internet server).

One or more embodiments thus associate addresses into groups within a trust environment. In one or more instances, a trusted interface is provided that is associated only with the interior local area network (LAN) and the address space associated with that is numbered in a very specific way such that even without knowing the details of a customer's network, an employee of an MSO or other ISP in a call center can diagnose issues (e.g., a tablet computing device on the home or small business wireless local area network is not functioning properly). In some cases, if the interfaces are "up," an MSO or other ISP will always know which actual address of the prefix that has been assigned to the particular customer is actually on that interface and the MSO or other ISP will always use the first address out of the /64 network prefix in order to assign the same to the actual interface itself. This simplifies management. On the other hand, in some cases, any router implementing a packet filtering firewall will prevent the MSO from knowing exactly how a customer's network is configured. The typical tools for probing such information, beyond a routing protocol such as ISIS which will only exchange routes, not necessarily the entire routing topology of the customer's networks, imply that the MSO in such instances will not have the visibility as described.

Another aspect of one or more embodiments is the trust relationship and how it can be superimposed over to an existing piece of equipment; in at least some instances, this aspect simplifies firewall rules. In a preferred but non-limiting embodiment, packets don't travel from un-trusted to trusted zones; they only travel from trusted to un-trusted zones, i.e., from high to low, never low to high. This aspect advantageously simplifies security realms within a product, and has broad applicability.

As noted, the advanced wireless gateway is but one exemplary application; for example, one or more embodiments can be employed in the context of a wired home gateway that communicates over MoCA, wireless, and other techniques. Indeed, interfaces may include wired and/or wireless, and even interfaces currently not yet existing could make use of one or more techniques disclosed herein. Accordingly, while in some instances, techniques disclosed herein can be applied to an advanced wireless gateway wherein the MSO has a direct relationship with the vendor who supplies the gateway, in other cases, techniques disclosed herein can be applied to retail devices where the MSO does not have a direct vendor relationship to drive the implementation. There is enough flexibility in the design of one or more embodiments that aspects of the invention could be used by any number of service providers, including potentially telephony companies, wireless-only ISPs, and the like.

In some instances, depending on the architecture, embodiments of the invention can be employed in connection with set-top boxes (STBs); for example, a gateway STB which is, in essence, another form of data gateway that delivers video or re-encapsulates IP. In some instances, use can be made of the MoCA interface within a video architecture for distribution within a home or similar premises (e.g., a small business).

One or more embodiments advantageously improve upon previous implementations using IPv4 and/or provide a cleaner architecture for use with IPv6. In one or more embodiments, the IPv4 and IPv6 align closely so that it is operationally easier to support and less confusing to a customer if they choose to change configuration. From that standpoint, there are aspects of the invention that are applicable to IPv4. For example, if a given Interface of the gateway router had a subnet assigned for IPv4, it would also have an IPv6 prefix assigned and vice versa. While possible, it is presently believed that it would not be a best practice to have IPv4 subnets assigned in one way the router's interfaces and do something completely different with IPv6 prefixes from a support and network management perspective.

In any event, one or more embodiments are particularly suited for use in connection with IPv6, in connection with prefix delegation, because the models in this regard are quite different as between IPv4 and IPv6. Typical home routers employ IPv4 private address space behind a NAT/NAPT process to share one public IPv4 address among many privately addressed devices. Despite the imminent exhaustion of the IPv4 address space, there is no shortage of IPv4 private address space, as this address space is never intended to be routed beyond the home. However, in the case of IPv6, all the address space inside the home is globally unique, i.e., it is globally scoped address space. Thus, unlike in IPv4 where there is a network address translation (NAT) layer to convert the private address space to a public IPv4 address, so that access to the global Internet is available, in IPv6, all of the addresses are globally unique and there is no need for NAT. Eliminating the need to maintain a NAT significantly simplifies implementation of the network interface.

In some cases, the MSO is only aware of the length of prefix assigned, and may have no knowledge of the details of how the prefix is further divided and used. In the case of a device such as an advanced wireless gateway, the MSO may have limited visibility into the network, but many of these functions may only be enabled when a customer has specifically subscribed to a managed service. For customers with home routers that may conform to one or more embodiments of the invention, the subnet process could be the same, but the visibility in how this network space beyond the upper level prefix assignment itself might likewise be out of reach to the MSO.

Again, in many instances, in IPv6 all the address space will be available globally and the only restriction will be the firewall rules. One or more embodiments employ the notion of a simple security mechanism such as "trusted" vs. "un-trusted." In one or more embodiments, anything un-trusted will not be allowed to initiate a connection into the home. However, the connection could be initiated from the inside of the home network to the outside. Another aspect of interest is that in IPv6, one or more embodiments move beyond previous models of service provisioning, and are no longer limited to merely delivering Internet service to a customer's personal computer (PC). Heretofore, it has been typical to have a cable modem which is a bridge that only understands layer 2 (Ethernet frames). In IPv6, it can typically be assumed that everything in the home is routed and that multiple subnets exist within the home network. One or more embodiments thus assign a network block instead of a single public IPv4 address, as in current techniques. Instead, in one or more embodiments, every home gets a block of literally billions of individual IP addresses which can be further broken clown into smaller networks inside the home. This is a pertinent aspect of one or more embodiments.

Thus, one or more embodiments deliver services to a customer's network; the expectation is that the customer has a network, or that an entity such as an MSO or the like is giving the customer equipment to build one. Heretofore, the customer might have a network, but the network was really being treated as a PC behind a cable modem.

It should be noted that one or more embodiments of the invention can be implemented in a variety of hardware platforms, and the block diagrams herein are a non-limiting example.

In one or more embodiments, the aforementioned trust zones serve as the policy or driver of the firewall.

One or more embodiments define one or more standardized techniques for breaking an IPv6 prefix delegated by a service provider (an MSO is a non-limiting example) down into individual networks and sub-prefixes. One or more embodiments also cover a method for applying access control to a group of interfaces. It is believed that no current commercially-available consumer gateway router permits prefix delegation of networks larger than a /60 IPv6 prefix. One or more embodiments provide techniques by which a globally unique IPv6 prefix is allocated into specific /64 networks which are applied from the lowest-numbered to the highest-numbered network address and applied to the interfaces of an advanced wireless gateway or the like. One or more embodiments are applicable to such advanced wireless gateways as may be provided by an MSO or the like, as well as to commodity gateway routers obtained by a customer through retail. In addition, one or more embodiments provide techniques to define trust relationships between and among the interfaces of the advanced wireless gateway or the like to establish default firewall access rules and rules for changing the configuration to meet specific customer requirements.

As noted, it is envisioned that the IPv6 protocol will at first augment and eventually replace the IPv4 protocol currently in use as the remaining blocks of IPv4 address space become completely exhausted. A non-limiting exemplary embodiment makes use of an advanced wireless gateway in the form of an approved DOCSIS 3.0 cable modem with gateway router functions. Such equipment could, for example, be supplied to customers of an MSO. In some instances, customers with wideband service tiers could receive such devices before other customers.

Prefix Delegation (PD) is the process of providing a customer with a prefix that is large enough to allow the customer to further sub-divide the customer's leased prefix into individual networks within the customer's home or office Local Area Network (LAN) environment. There is value in creating a consistent approach for how the prefix is broken down in specific detail as this impacts product requirements (e.g., for the aforementioned advanced wireless gateway or similar device) that an MSO or the like conveys to vendors, as well as the consistency of the installation processes and support models of the MSO or similar entity.

In one or more embodiments, the size of the network allocations within the advanced wireless gateway or similar device are well-chosen for meeting the needs of the MSO or similar entity, but may be of a different size so long as the overall numbering technique is maintained. In exemplary embodiments, the advanced wireless gateway or similar device will itself always request a /56 prefix by default, but may also request a different size. Such request may be made, for example, to DHCP-PD (dynamic host control protocol—prefix delegation) servers of an MSO or the like. DHCP-PD servers could be located anywhere within the MSO access network, by way of example and not limitation in a head end 150 (e.g., DHCP server 3304 on LAN 158 but could also be on LAN 160), data center, or the like. Furthermore, in cases of sub-prefix delegation, even the router itself will have a DHCP server running on it. Thus, the DHCP server can be in the head end, data center, or even the premises (e.g., in the case of sub-delegation).

Many instances address a situation where the advanced wireless gateway or similar device acts as both an "edge" facing the MSO or the like and a "core" serving all clients within the customer home network. However, in some use cases (for example, in the short to mid-term), the advanced wireless gateway or similar device will supply Prefix Delegation (PD) information in addition to allocating /64 networks to additional routers within the customer's LAN (local area network). In such use cases, the additional routers within the customer's network will typically request a prefix to be delegated to them from the advanced wireless gateway or similar device. Many routers will supply a "hint" in their request for how large a network they wish to receive. One or more embodiments provide techniques by which the advanced wireless gateway or similar device will use the hint information to round up or down in order to supply a specific sub-prefix to the downstream router that is appropriate based on the size of the prefix delegated to the advanced wireless gateway or similar device itself.

In one or more embodiments, each prefix is from a DHCP scope and/or pool associated with a specific interface that the requesting "core" router is directly connected to and each prefix is within the limits of the prefix length the MSO or similar entity has provided to the advanced wireless gateway or similar device acting as the "edge." For example, if the MSO or similar entity supplies a /56 prefix to the advanced wireless gateway or similar device, the routers that are "deeper" within the customer LAN may "hint" in their request for a /56 prefix, but the advanced wireless gateway or similar device will ignore this and supply a /60 instead. The advanced wireless gateway or similar device will build a list of candidate /60 prefixes whenever it receives a delegated prefix from the MSO or similar entity, allowing the advanced wireless gateway or similar device to supply up to 8 such /60 prefixes with a specific /60 (the lowest vs. highest numbered prefix) associated with individual interfaces of the advanced wireless gateway or similar device, including both wired and wireless interfaces.

It is believed that the current approaches for breaking down an IPv6 prefix have been largely devoid of practical use cases and do not satisfy realistic near to medium term requirements for IPv6 deployment. One or more embodiments provide elegant techniques for breaking up a customer's delegated prefix on the router platform of an advanced wireless gateway or similar device so that each of the defined interfaces will always use a specific, predictable part of the prefix even as the size of the delegated prefix is increased or decreased in size. One or more embodiments provide a more consistent management model in order to simplify support at both the time of installation and during use, through the appropriate support groups, that is applicable to both managed and unmanaged service tiers.

Referring again to FIG. 5, in a non-limiting exemplary embodiment, each of the wireless SSIDs, the entire four-port Ethernet switch, and the MoCA interface have individual IP subnets which are numbered in a specific way. The delegated prefix is broken into constituent parts in the following manner:

The prefix is first broken into two halves.
The lower numbered half is further broken into equal halves 504, 506 from which individual /64 networks are allocated.
The lower numbered quarter 504 is dedicated to wired networks.
The lowest numbered /64 network 508, Wired1, is assigned to the Ethernet switch and associated with the first trust zone.
The next higher numbered /64 network 508, Wired2, is assigned to the Ethernet switch and associated with the second trust zone, if needed (off by default).
The higher numbered quarter 506 is dedicated to wireless networks.
The lowest numbered /64 network 508 is assigned to the first WiFi SSID (SSID1) and associated with the first trust zone.
The next higher numbered /64 network 508 is assigned to the second WiFi SSID (SSID2) and associated with the first trust zone.
The higher numbered half is broken into individual equal-sized prefixes of /60 510 for use in Prefix Delegation (PD) for allocation to routers within the customer network requesting PD.

As alluded to above, one or more embodiments break the advanced wireless gateway or similar device into conceptual "trust zones" in which the interfaces are grouped into zones which are either implicitly allowed to communicate with each other (trusted) or expressly forbidden from doing so (untrusted). This "trust zone" aspect of one or more embodiments supplies default firewall behavior to control traffic flow between and among zones while providing flexibility for both residential and commercial services tiers when reconfiguration is needed to create additional zones.

One or more embodiments also associate a trust model that denotes firewall behaviors across the various interfaces of an advanced wireless gateway or similar device. A non-limiting exemplary advanced wireless gateway or similar device has four Ethernet interfaces 304, five wireless SSIDs=5) and a MoCA interface 391. The four-port Ethernet switch may be part of a single trusted "zone" along with as many as three WiFi SSIDs. One or more SSIDs and/or Ethernet ports are associated with a second trusted zone and/or or one or more un-trusted zones. The un-trusted zones of the advanced wireless gateway or similar device are defined to allow servers that are exposed to the public Internet. The trust model affects how packets are allowed to flow; in one or more exemplary embodiments, packets are only allowed to flow from a higher trust to a lower trust, not the other way around. For example, packets sourced from an un-trusted zone (usually associated with the Internet) cannot gain access to the customer's computer system or DVR content store located on a trusted zone.

Many commercial tiers of service permit customers to operate publicly accessible servers across the service provided by an MSO or similar entity. Furthermore, future networks may include public "hot spots" provided from a customer's advanced wireless gateway or similar device, which will require public access. In one or more embodiments, the Ethernet and wireless cases outlined above form the typical "un-trusted" zones within the advanced wireless gateway or similar device, in that it is not desirable for these publicly accessible zones to have access to the customer's interior LAN, which can include confidential and/or protected information stores and other data sources that a customer would generally not wish to expose.

One or more non-limiting exemplary embodiments are applicable to small-scale small office and/or home networks. However, aspects of an exemplary framework can be scaled from very small to very large proportions. One or more embodiments advantageously provide a simple technique that can be re-used regardless of the size of the prefix allocated, and/or or that provides consistency in a dual stack environment (both IPv4 and IPv6 allocation on the router of the advanced wireless gateway or similar device).

Figure 6:
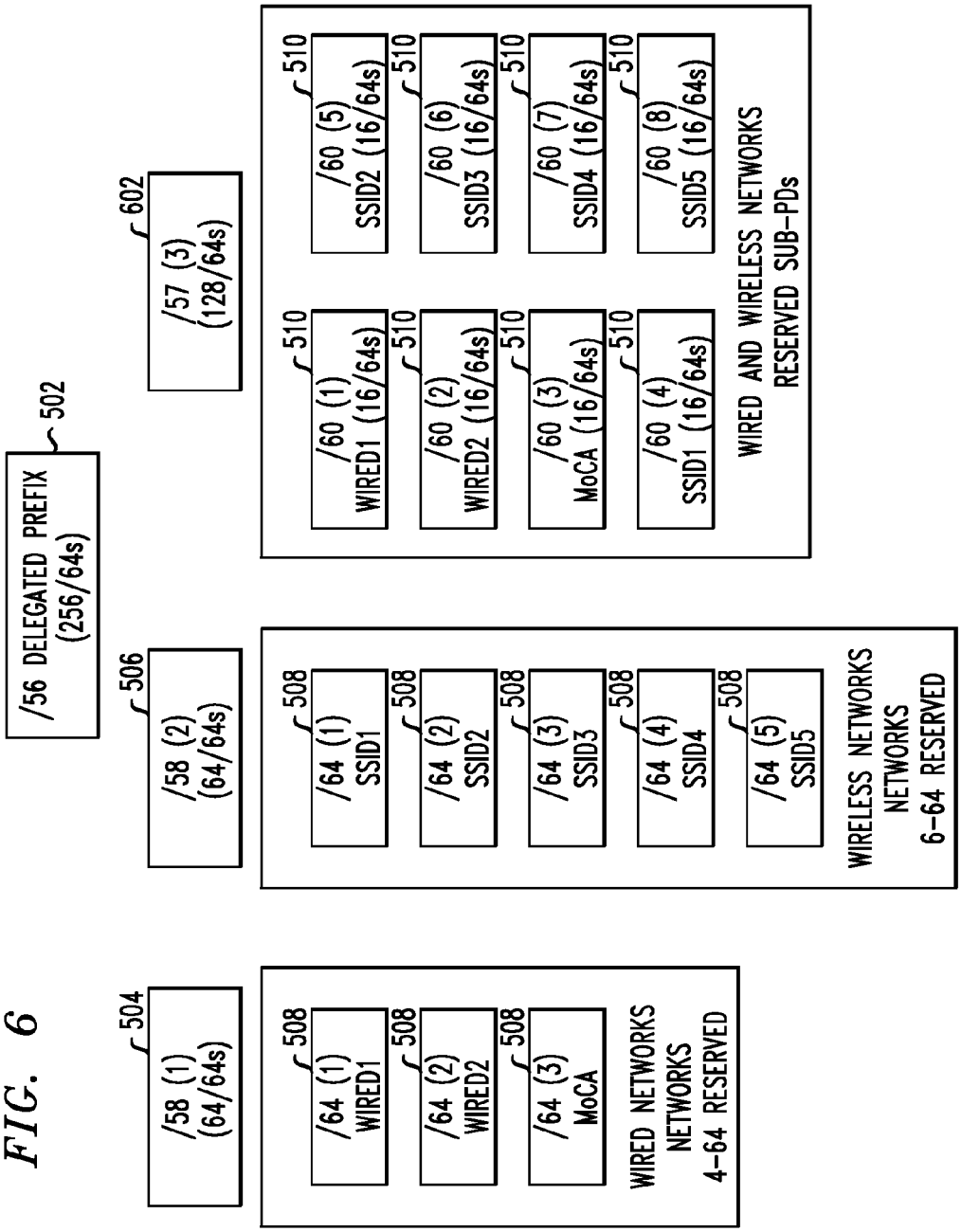
FIG. 6 shows a second exemplary /56 option for network allocation and sub-prefix delegation, according to an aspect of the invention.

FIG. 6 shows an alternative embodiment. Elements similar to those in FIG. 5 and having the same reference character are not described again. Here, the division of /56 502 is into two /58 networks 504, 506 and a /57 network 602 broken into eight /60 sub-prefixes 510, allocated as shown.

Figure 7:
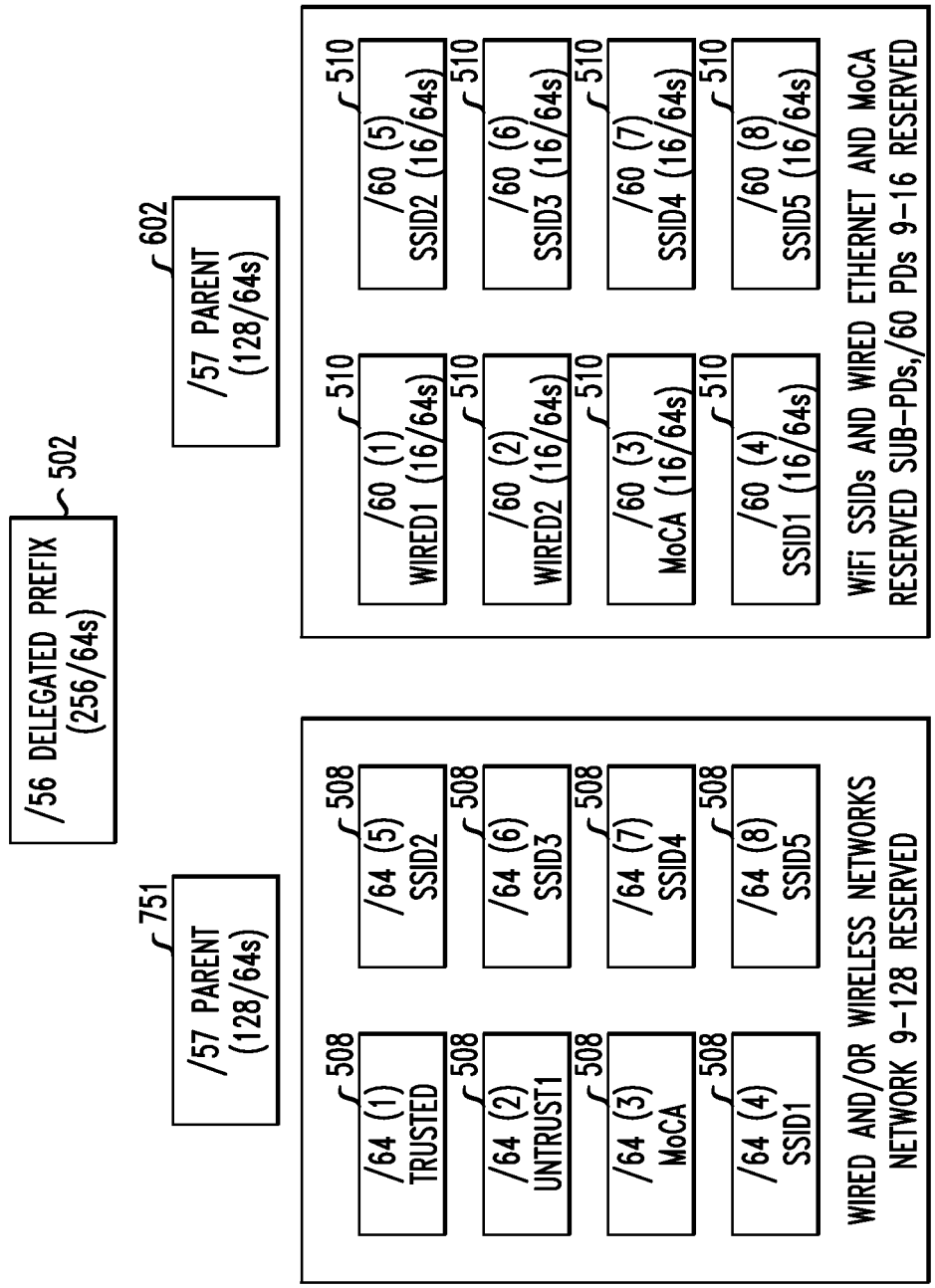
FIG. 7 shows a third exemplary /56 option for network allocation and sub-prefix delegation, according to an aspect of the invention.

FIG. 7 shows an alternative embodiment with elements similar to those in FIGS. 5 and 6 having the same reference character and not described again. Here, the division of /56 502 is into two /57 networks 751, 602. The latter is again broken into eight /60 sub-prefixes 510. The former is broken into 128/64 networks 508, allocated as shown.

In one or more embodiments, the first sub-prefix is used for /64 networks assigned to interfaces. The second prefix is used for sub-prefix delegation to additional routers for their own interfaces. For example, in FIG. 5, SSID1 508 under 506 is an SSID made available from the advanced wireless gateway or similar device to allow connection by wireless devices. On the other hand, SSID1 510 under 514 depicts the advanced wireless gateway or similar device connecting to another router instead of connecting to devices. In one or more embodiments, prefixes are assigned to links but individual devices are assigned addresses.

Figure 8:
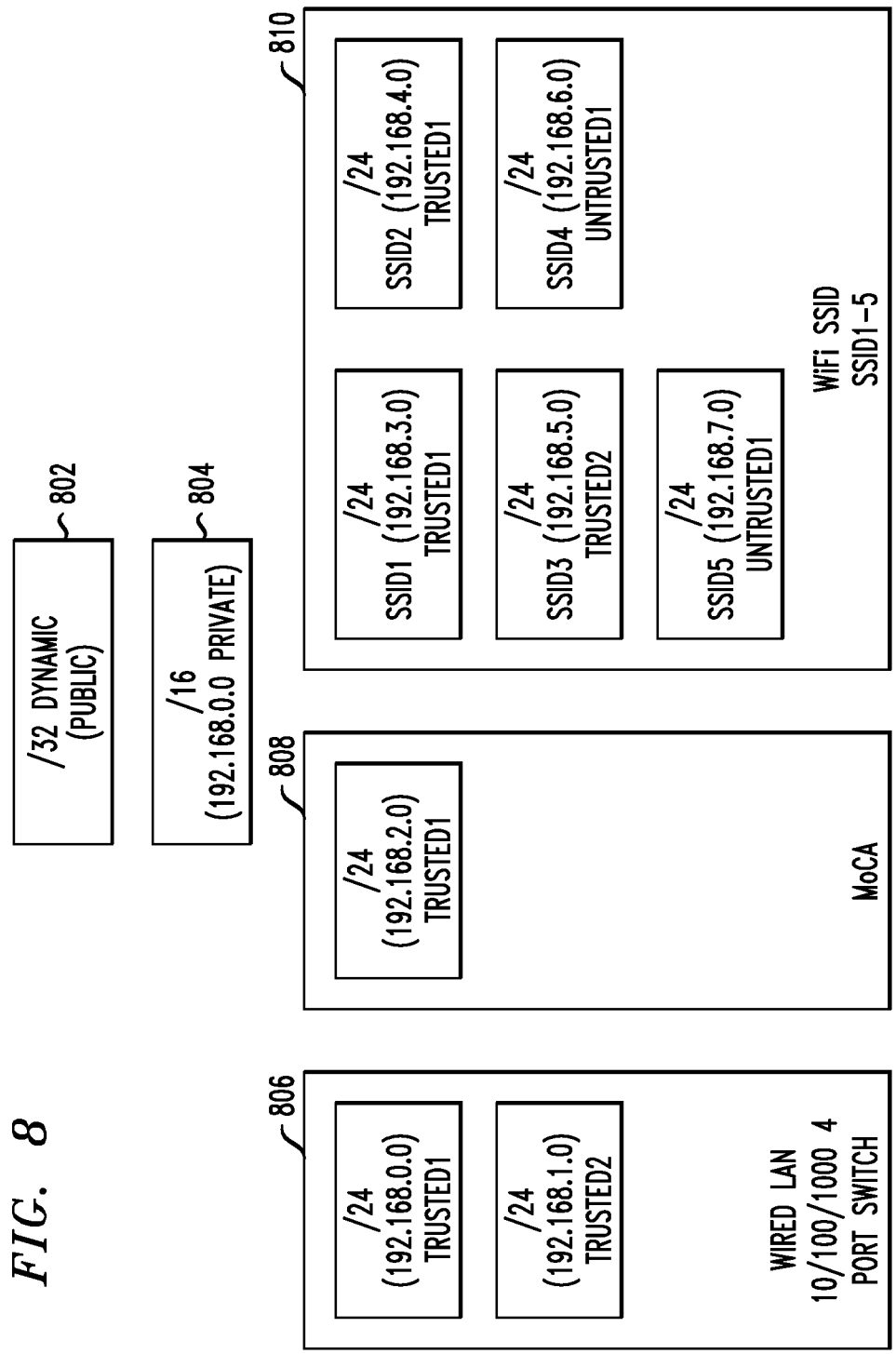
FIG. 8 shows exemplary IPv4 public and private sub-network allocation.

FIG. 8 shows exemplary IPv4 public and private sub-network allocation. In particular, FIG. 8 shows LAN interfaces and DHCP pools for an advanced wireless gateway employing IPv4. The exemplary advanced wireless gateway uses NAPT (network address and port translation) for DHCP supplied public /32 and may use RIPv2 route announcements for static routed subnets of /30 to /24 for commercial modes of operation. In one or more IPv4 instances, the advanced wireless gateway or similar device has two processes; namely, a DHCP client and a DHCP server. The DHCP client is used to request a single IPv4 address (/32), which is then given to the gateway. When the gateway provides addresses to clients behind the gateway, it functions as a DHCP server, providing private RFC 1918 addresses and mapping same to ports on the single public address. If the device is addressed with static public addresses without NAPT (e.g., commercial), the exemplary advanced wireless gateway must have enough addresses for client blocks and all routers within the topology. Due to the aforementioned IPv4 address exhaustion, use of large blocks of static IP is not considered to be realistic for the medium to long term. Thus, to summarize, there are three possible cases, namely, (i) no NAT, commercial; (ii) NAT with static assignment of IPv4 address without DHCP; and (iii) NAT with DHCP client without static assignment of IPv4 address (often used in commercial and residential).

Thus, with continued reference to FIG. 8, note public address 802, unique throughout the world, facing the Internet. Note also private network 804, not unique in the world, and having context only in the premises network; under private network 804 note also subdivisions for wired LAN 806, MoCA 808, and WiFi SSID 810, all of which are in the private address space. In essence, one or more IPv4 embodiments "mirror" what is done in the IPv6 embodiments but with significantly smaller sub-nets because of the smaller address space. That is, in one or more IPv4 embodiments, give 254 addresses to each of the individual interfaces.

Figure 9:
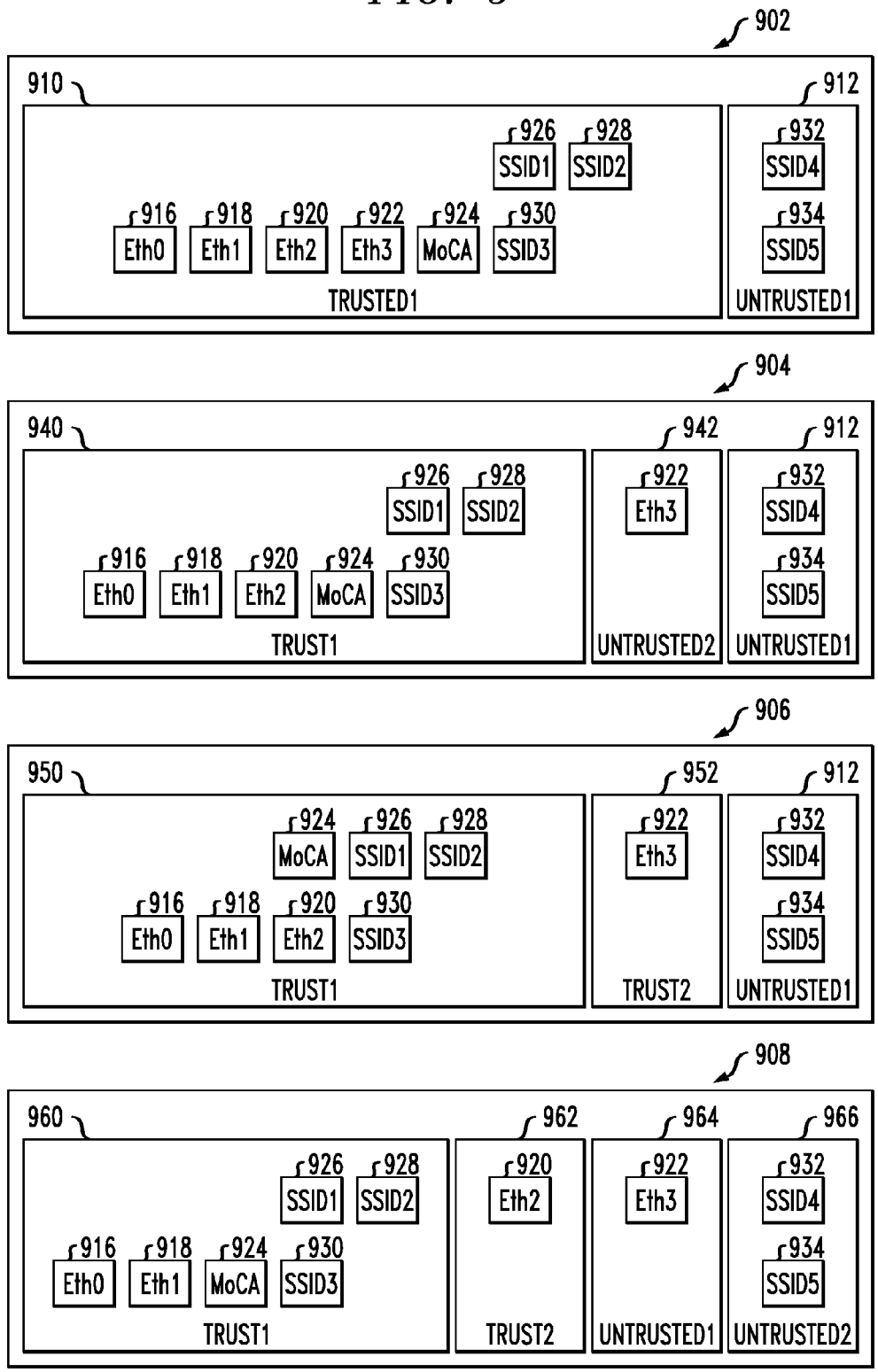
FIG. 9 shows exemplary IPv4 and IPv6 zones and groups, according to an aspect of the invention.

FIG. 9 shows exemplary IPv4 and IPv6 zones and groups. Example 902 depicts a configuration with a single trusted zone 910 and a single un-trusted zone 912. An Internal Ethernet LAN including all four Ethernet ports 916, 918, 920, 922; a single MoCA interface 924; and three of the five WiFi SSIDs 926, 928, 930 are all part of the single trusted zone 910. The public facing "hot spot" SSIDs 932, 934 constitute the single un-trusted zone 912.

Example 904 depicts a configuration with a single trusted zone 940 and two un-trusted zones 912 (same as case 902), 942. The Ethernet LAN including three of the four ports 916, 918, 920; the single MoCA interface 924; and three of the five WiFi SSIDs 926, 928, 930 are on the trusted zone 940, while port 4 (Eth3) 922 of the Ethernet LAN is on the second un-trusted zone 942 established as a DMZ perimeter for allowing public servers.

Example 906 depicts a configuration with two trusted zones 950, 952 and a single un-trusted zone 912 (same as case 902). An Ethernet LAN including three of the four ports 916, 918, 920; the single MoCA interface 924; and three of the five WiFi SSIDs 926, 928, 930 are on the Trust1 zone 950, while port 4 (Eth3) of the Ethernet LAN 922 is on the Trust2 zone 952 established to allow a split tunnel configuration.

Example 908 depicts a configuration with two trusted zones 960, 962 and two un-trusted zones 964, 966. An Ethernet LAN including two of the four ports 916, 918; the single MoCA interface 924; and three of the five WiFi SSIDs 926, 928, 930 are on the Trust1 zone 960, while Ethernet port 3 (Eth2) 920 is used for the Trust2 zone 962 for split tunnel support. Ethernet Port 4 (Eth3) 922 is on the Untrustd1 zone 964 established as a DMZ perimeter for allowing public servers and the Untrustd2 zone 966 is established for SSID4 932 and SSID5 934.

Some non-limiting exemplary embodiments support 2-5 routers per home or other premises; it is believed that 3 routers is a realistic number in one or more instances.

Exemplary Software and Hardware Implementation

In a non-limiting exemplary embodiment, an advanced wireless gateway or similar device includes, in terms of hardware, four-port Ethernet switch 304, MoCA interface 391, and multiple SSIDs 302 supporting a wireless access point. In terms of software layers, a suitable route process, policy engine, firewall, and SQL packet inspection control run on top of the physical ports associated with the switch 304, physical MoCA interface 391, RF interface 301, and wireless access point 302 and its associated radios. Thus, in one or more embodiments, the software layers are stored in persistent storage 308 and when the gateway boots, the software is loaded into memory 310 causing microprocessor 306 to configure the interfaces and ports in accordance with the prefix designation logic as shown in the figures.

Recapitulation

Figure 10:
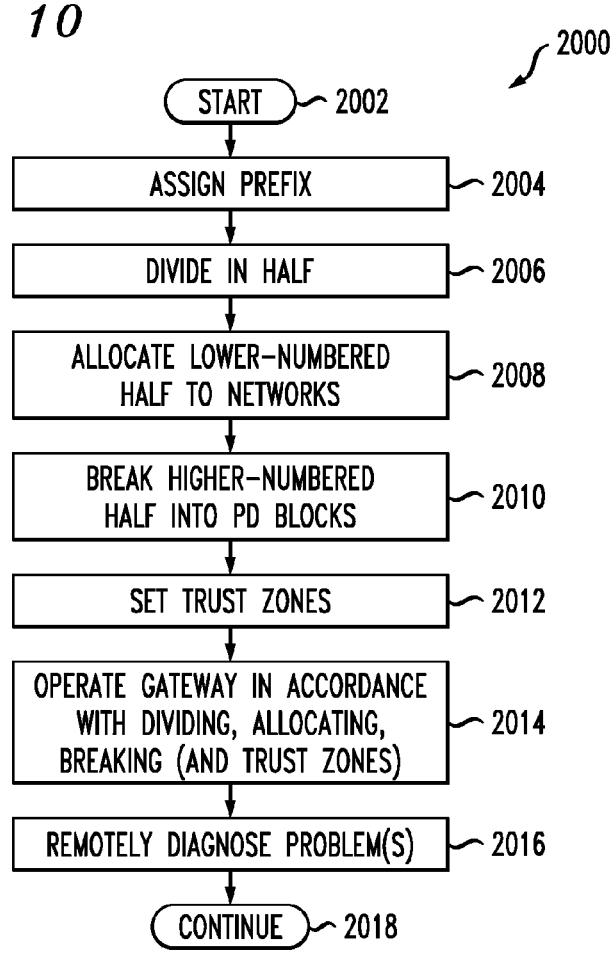
FIG. 10 is a flow chart of exemplary method steps, according to an aspect of the invention.

Attention should now be given to flow chart 2000 of FIG. 10, which begins at 2002. Given the discussion thus far, it will be appreciated that, in general terms, an exemplary method, according to an aspect of the invention, includes the step 2006 of dividing a delegated internet protocol version six prefix into a lower-numbered portion (e.g., a half) such as (504 and 506) or 751 and a higher-numbered portion (e.g., a half) such as (512 and 514) or 602. The delegated prefix is assigned to a gateway device which is interposed between an internet and a premises. A further step 2008 includes allocating either the lower-numbered portion (e.g., half) or the higher-numbered portion (e.g., half) to a plurality of networks such as 508 associated with the premises. The plurality of networks could include, for example, a single customer network with a plurality of sub networks. Still further steps include, at 2010, breaking the other portion (e.g., half) into a plurality of blocks such as 510 for use in prefix delegation for allocation to routers associated with the premises requesting the prefix delegation; and, at 2014, operating the gateway device in accordance with the dividing, allocating, and breaking steps.

Processing Continues at 2018.

Operating the gateway device in accordance with the dividing, allocating, and breaking includes, for example, sending packets to different ports corresponding to the allocation. In one or more embodiments, the gateway device is on the edge/perimeter and other routers in the home network(s) are in the core. In some cases, the gateway device renews leases on granted prefixes.

In one or more embodiments, the steps described thus far are carried out by the gateway device or a similar device. As used herein, Internet with the capital "I" is the global Internet, while "internet" is a generic description of any inter-network of computer systems and routing topologies. In one or more embodiments, the decision on which parts of a given prefix to use in a given way is completely arbitrary, but follows logic on how a home router's interfaces are typically implemented and how they are used. While in some instances, there may be only perhaps one or two subnets within the home, the elimination of NAT and the need for more specific security policies leads to more networks within the home, effectively one network per interface type and one each for wireless SSIDs. In some cases, there may be, for example, six for a residential customer and as many as nine or ten for a commercial customer with more business-centric needs. These values are exemplary and non-limiting. While IPv4 does not necessarily have to be divided into all of these networks, it is advisable to use the same IP allocation for one protocol as for another to prevent complicating the administration or configuration of the router.

Optionally, a further step 2012 includes pre-categorizing at least some of the plurality of networks associated with the premises into at least first and second trust zones; for non-limiting examples, refer to FIG. 9 and accompanying text. In such cases, as indicated by the parenthetical "(and trust zones)," the operating step 2014 can further include operating the gateway device in accordance with the pre-categorizing step.

In some instances, an additional step 2004 includes assigning, to the gateway device, the delegated internet protocol version six prefix. This could be carried out, for example, by the MSO or the like.

In some instances, as noted, the internet is the Internet, i.e., the global system of interconnected computer networks that use transfer control protocol/internet protocol (TCP/IP) to serve very large numbers of users worldwide. The Internet is a network of networks including millions of private, public, academic, business, and government networks, of local to global scope, that are linked by a broad array of electronic, wireless and optical networking technologies. The Internet carries a vast range of information resources and services, such as the inter-linked hypertext documents of the World Wide Web (WWW) and the infrastructure to support electronic mail. The Internet may also be referred to herein as a global internet. Internetworking is the practice of connecting a computer network with other networks through the use of gateways that provide a common method of routing information packets between the networks. The resulting system of interconnected networks is called an internetwork, or simply an internet (lower case).

As noted, in some instances, the lower-numbered portion is the lower-numbered half and the higher-numbered portion is the higher-numbered half. In some cases, the lower-numbered half is allocated to the plurality of networks associated with the premises, and the higher-numbered half is broken into the plurality of blocks for use in the prefix delegation.

As noted, in some cases, the delegated internet protocol version six prefix is a /56 delegated prefix such as 502, and the plurality of networks associated with the premises comprise one hundred twenty eight /64 networks such as 508. Furthermore, in some cases, the allocating of the lower-numbered half to the plurality of networks associated with the premises further includes breaking the lower-numbered half in half to obtain a lower-numbered /58 network quarter such as 504 and a higher-numbered /58 network quarter such as 506; assigning the lower-numbered /58 network quarter such as 504 to sixty four wired ones of the one hundred twenty eight /64 networks; and assigning the higher-numbered /58 network quarter such as 506 to sixty four wireless ones of the one hundred twenty eight /64 networks. Furthermore, in some cases, the plurality of blocks such as 510 for use in the prefix delegation comprise /60 prefixes. Please note that "prefixes" and "blocks" are used somewhat interchangeably herein. The term "blocks" is also used to refer to blocks in the block diagrams. The skilled artisan will appreciate the intended meaning from the context.

With particular reference to FIG. 5, in some cases, the breaking of the higher-numbered half into the plurality of blocks further includes breaking the higher-numbered half in half to obtain a lower-numbered /58 prefix delegation quarter such as 512 and a higher-numbered /58 prefix delegation quarter; such as 514; assigning the lower-numbered /58 prefix delegation quarter such as 512 to prefix delegation associated with wired local area networks; and assigning the higher-numbered /58 prefix delegation quarter such as 514 to prefix delegation associated with wireless local area networks. In one or more embodiments, the router's local DHCP-PD server could assign sub-prefixes while being assigned a /64 network to each interface.

With particular reference to FIG. 6, in some cases, the higher-numbered half such as 602 is a /57 half that is not broken down further.

With particular reference to FIG. 7, in some cases, the lower- and higher-numbered halves such as 751, 602 are each /57 halves that are not broken down further.

Note that "not broken down further" is intended to refer to cases such as the right hand side of FIG. 6 and both sides in FIG. 7, as opposed to, say, the left-hand side of FIG. 6. Note also that "not broken down further" does not preclude assignment of individual networks therein.

Reference should now be had to FIGS. 3 and 9. In a non-limiting example, a gateway device such as 106 has a four-port Ethernet switch such as 304, a multimedia over coaxial cable interface such as 391, and a wireless interface such as 302 having five service set identifiers (e.g., SSIDs). Referring to 902, in some cases, a first trust zone such as 910 is a trusted zone and a second trust zone such as 912 is an un-trusted zone. One example of pre-categorizing includes assigning the four-port Ethernet switch, the multimedia over coaxial cable interface, and a lowest numbered three of the five service set identifiers to the first trust zone, as seen at 916, 918, 920, 922, 924, 926, 928, and 930 in example 902; as well as assigning a highest numbered two of the five service set identifiers to the second trust zone, as seen at 932, 934 in example 902. In such cases, step 2014 can include allowing packets to travel from the trusted zone to the un-trusted zone but not from the un-trusted zone to the trusted zone.

Referring to 904, in some cases, the pre-categorizing further includes pre-categorizing into at least a third trust zone such as 942; the first trust zone such as 940 is a trusted zone, and the second and third trust zones such as 912, 942 are un-trusted zones. Another example of pre-categorizing includes assigning a lowest three numbered ports of the four-port Ethernet switch, the multimedia over coaxial cable interface, and a lowest numbered three of the five service set identifiers to the first trust zone, as seen at 916, 918, 920, 924, 926, 928, and 930 in example 904; as well as assigning a highest numbered two of the five service set identifiers to the second trust zone, as seen at 932, 934 in example 904, and assigning a highest numbered one of the ports of the four-port Ethernet switch to the third trust zone, as seen at 922 in example 904. In such cases, step 2014 can include allowing packets to travel from the trusted zone to either of the un-trusted zones but not from either of the un-trusted zones to the trusted zone. In some cases, with multiple untrusted zones, packets might be allowed to travel from one untrusted zone to another. However, in some instances, there might be multiple levels of trust, possibly assigned numerical values, in which case some untrusted zones might be more relatively more trusted than another untrusted zone. In such cases, packets might be allowed to travel from the untrusted zone with higher trust to the untrusted zone with lower trust, but not vice versa. In some instances, the WAN interface is the untrusted zone unless additional interfaces are configured to join the untrusted zone and leave the trusted zone. An example would include a customer placing a publicly accessible server onto a DMZ type of interface which would fall into the "untrusted" category.

Referring to 906, in some cases, the pre-categorizing further includes pre-categorizing into at least a third trust zone such as 952. The first and third trust zones such as 950 and 952 are trusted zones, and the second trust zone such as 912 is an un-trusted zone. Still another example of pre-categorizing includes assigning a lowest three numbered ports of the four-port Ethernet switch, the multimedia over coaxial cable interface, and a lowest numbered three of the five service set identifiers to the first trust zone, as seen at 916, 918, 920 924, 926, 928, and 930 in example 906; as well as assigning a highest numbered two of the five service set identifiers to the second trust zone, as seen at 932, 934 in example 906, and assigning a highest numbered one of the ports of the four-port Ethernet switch to the third trust zone, as seen at 922 in example 906. In such cases, step 2014 can include allowing packets to travel from either of the trusted zones to the un-trusted zone; allowing packets to travel between the trusted zones; and not allowing packets to travel from the un-trusted zone to either of the trusted zones.

Referring to 908, in some cases, the pre-categorizing further includes pre-categorizing into at least a third trust zone such as 962 and a fourth trust zone such as 964. Note that the un-trusted zone with SSID4 and SSID5 is re-numbered as 966 in example 908 because it is labeled "Untrustd2" therein. The first and third trust zones are trusted zones; and the second and fourth trust zones are un-trusted zones. An even further example of pre-categorizing includes assigning a lowest two numbered ports of the four-port Ethernet switch, the multimedia over coaxial cable interface, and a lowest numbered three of the five service set identifiers to the first trust zone, as seen at 916, 918, 924, 926, 928, and 930 in example 906; assigning a highest numbered two of the five service set identifiers to the second trust zone 966, as seen at 932, 934 in example 908; assigning a next highest numbered one of the ports of the four-port Ethernet switch to the third trust zone 962, as seen at 920 in example 908; and assigning a most highly numbered one of the ports of the four-port Ethernet switch to the fourth trust zone 964, as seen at 922 in example 908. In such cases, step 2014 can include allowing packets to travel from either of the trusted zones to either of the un-trusted zones; allowing packets to travel between the trusted zones; and not allowing packets to travel from either of the un-trusted zones to either of the trusted zones.

Again, as an implementation detail, there can be more than one trusted and one untrusted zone. A cascade of different "weights" could be applied so that a higher "trust" would limit access in the same manner as the simplified "trusted" or "untrusted" example. In effect, a higher numeric trust would correspond to a higher level of trust and any lower trust assigned to a different interface would be unable to forward packets to that interface. In the simplest implementation where only two zones exist, any interface that is added to the "untrusted" is at that single plane of trust and therefore implicitly allowed to communicate among any interfaces within that zone.

As noted elsewhere, in some cases, step 2014 includes applying the at least first and second trust zones as policy inputs to a firewall associated with the gateway device. A suitable packet processor inspects the packets and compares them against the list of packets associated with a trusted network, e.g., by physical interface, by MAC address, and by IP address, and drops or forwards packets as appropriate. Microprocessor 306 may be provided with packet inspection functionality, and policies may be provided in persistent storage 308 (e.g., as configuration parameters to run within the firewall software) and loaded into memory 310 to cause processor 306 to take appropriate actions with each packet based on the policies.

Optional step 2016 includes remotely diagnosing at least one problem associated with at least one of the plurality of networks such as 508 associated with the premises, based on the allocating step 2008. One or more embodiments assist customer service representatives when they get a call from one of the subscribers saying, for example, that his or her tablet device is not working. The standardized assignment of prefixes helps in remote diagnosis.

With reference to FIG. 8, another exemplary method includes obtaining an internet protocol version four public address 802 associated with a gateway device which is interposed between an internet and a premises. In accordance with predetermined rules, a private address space for the premises is divided into at least a first subdivision for at least one of a wired sub-network, a wireless sub-network, and a multimedia over coaxial cable interface (e.g., 806), and a second subdivision for at least another one of the wired sub-network, the wireless sub-network, and the multimedia over coaxial cable interface (e.g. 808 or 810). A first trust value is assigned to at least a portion of the first subdivision and a second trust value is assigned to at least a portion of the second subdivision in accordance with the predetermined rules. Purely by way of example, the wired and/or MoCA interfaces could be trusted and the SSIDs could be partially trusted and partially untrusted. A further step includes operating the gateway device in accordance with the obtaining, dividing, and assigning steps.

In another aspect, one or more embodiments include an article of manufacture including a computer program product, the computer program product including a tangible computer-readable recordable storage medium, storing in a non-transitory manner computer readable program code, the computer readable program code including computer readable program code configured to carry out or otherwise facilitate any one, some, or all of any of the methods steps described herein.

In still another aspect, an exemplary gateway device (FIG. 3 shows a non-limiting example) is provided for interposition between an internet and a premises. The apparatus includes a memory 310 and at least one processor 306 that is coupled to the memory and operative to carry out or otherwise facilitate any one, some, or all of any of the methods steps described herein. For example, the at least one processor may be operative to divide a delegated internet protocol version six prefix, which is assigned to the gateway device, into a lower-numbered portion and a higher-numbered portion; allocate one of the portions to a plurality of networks associated with the premises; break the other portion into a plurality of blocks for use in prefix delegation for allocation to routers associated with the premises requesting the prefix delegation; and operate the gateway device in accordance with the dividing, allocating, and breaking.

In some instances, the at least one processor is further operative to pre-categorize at least some of the plurality of networks associated with the premises into at least first and second trust zones, and the at least one processor is operative to operate the gateway device in accordance with the pre-categorizing.

In some instances, the lower-numbered portion is the lower-numbered half and the higher-numbered portion is the higher-numbered half.

In some cases, the lower-numbered half is allocated to the plurality of networks associated with the premises, and the higher-numbered half is broken into the plurality of blocks for use in the prefix delegation.

In a non-limiting example, the device may further include a wired network switch 304, coupled to the memory and the at least one processor; a multimedia over coaxial cable interface 391, coupled to the memory and the at least one processor; and a wireless interface 302 having a plurality of set identifiers, coupled to the memory and the at least one processor. In some such cases, the first trust zone is a trusted zone and the second trust zone is an un-trusted zone. In some instances, the pre-categorizing includes: assigning the wired network switch, the multimedia over coaxial cable interface, and a first portion of the service set identifiers to the first trust zone; and assigning a second portion of the service set identifiers to the second trust zone. Furthermore, in some such cases, operating in accordance with the pre-categorizing includes allowing packets to travel from the trusted zone to the un-trusted zone but not from the un-trusted zone to the trusted zone.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

In some instances, a portal server 3303 in head end 150 (shown on LAN 158 but could also be on LAN 160) is employed; for example, a significant portion of the configuration information, and the user interface, could be located on portal server 3303. This configuration could then be pushed down to the router.

Figure 11:
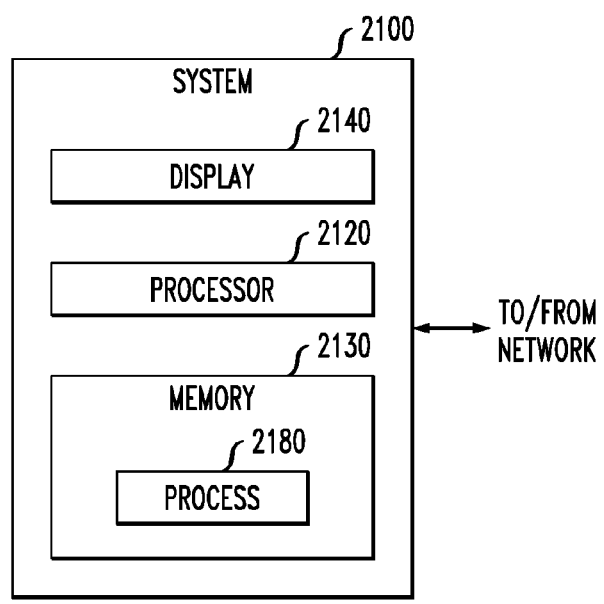
FIG. 11 is a block diagram of an exemplary computer system useful in implementing at least a portion of one or more embodiments of the invention.

Many aspects of the invention can be implemented, for example, on an advanced wireless gateway or similar device, as shown in FIG. 3, with suitable software layers to implement logic as described herein. Some aspects of the invention may involve a server or other general purpose computer. FIG. 11 is a block diagram of a system 2100 that can implement some pertinent aspects or processes, processor 2120 of which is representative of processors associated with servers, clients, set top terminals or gateways 106, DBWAD, SRM, GSRM, MAS 104A, personal media devices, portal server 3303, smart phones, desktop or laptop computers, smart roaming devices, and any other elements with processing capability depicted in the other figures. In one or more embodiments, inventive steps are carried out by one or more of the processors in conjunction with one or more interconnecting network(s). Again, in some cases, most or all steps are carried out, or at least facilitated by, the advanced wireless gateway of FIG. 3 or a device with similar functionality.

As shown in FIG. 11, memory 2130 configures the processor 2120 to implement one or more aspects of the methods, steps, and functions disclosed herein (collectively, shown as process 2180 in FIG. 11). The memory 2130 could be distributed or local and the processor 2120 could be distributed or singular. The memory 2130 could be implemented as an electrical, magnetic or optical memory, or any combination of these or other types of storage devices. It should be noted that if distributed processors are employed, each distributed processor that makes up processor 2120 generally contains its own addressable memory space. It should also be noted that some or all of computer system 2100 can be incorporated into an application-specific or general-use integrated circuit. For example, one or more method steps could be implemented in hardware in an ASIC rather than using firmware. Display 2140 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system including hardware, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, in some instances (e.g., the portal server), the term "memory" encompasses any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 2100 as shown in FIG. 11) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include, for example, a firewall policy module and a prefix assignment module; any or all of the software components shown in the figures can be implemented with suitable modules. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts (for example, to generate information to supply to the GSRM), and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation, Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, any blocks, components, sub-blocks, sub-components, modules and/or sub-modules may be realized by one or more DSPs. A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
dividing a delegated internet protocol version six prefix, which is assigned to a gateway device which is interposed between an internet and a premises, into a lower-numbered portion and a higher-numbered portion;
allocating one of said lower-numbered portion and said higher-numbered portion to a plurality of networks associated with said premises;
breaking another one of said lower-numbered portion and said higher-numbered portion into a plurality of blocks for use in prefix delegation for allocation to routers associated with said premises requesting said prefix delegation; and
operating said gateway device in accordance with said dividing, allocating, and breaking steps.

2. The method of claim 1, further comprising pre-categorizing at least some of said plurality of networks associated with said premises into at least first and second trust zones, wherein said operating step further comprises operating said gateway device in accordance with said pre-categorizing step.

3. The method of claim 2, further comprising assigning, to said gateway device, said delegated internet protocol version six prefix.

4. The method of claim 2, wherein said internet comprises the Internet.

5. The method of claim 4, wherein said lower-numbered portion comprises a lower-numbered half and said higher-numbered portion comprises a higher-numbered half.

6. The method of claim 5, wherein:
said lower-numbered half is allocated to said plurality of networks associated with said premises; and
said higher-numbered half is broken into said plurality of blocks for use in said prefix delegation.

7. The method of claim 6, wherein:
said delegated internet protocol version six prefix comprises a /56 delegated prefix;
said plurality of networks associated with said premises comprise one hundred twenty eight /64 networks;
said allocating of said lower-numbered half to said plurality of networks associated with said premises further comprises:
breaking said lower-numbered half in half to obtain a lower-numbered /58 network quarter and a higher-numbered /58 network quarter;
assigning said lower-numbered /58 network quarter to sixty four wired ones of said one hundred twenty eight /64 networks; and
assigning said higher-numbered /58 network quarter to sixty four wireless ones of said one hundred twenty eight /64 networks; and
said plurality of blocks for use in said prefix delegation comprise /60 blocks.

8. The method of claim 7, wherein said breaking of said higher-numbered half into said plurality of blocks further comprises:
breaking said higher-numbered half in half to obtain a lower-numbered /58 prefix delegation quarter and a higher-numbered /58 prefix delegation quarter;
assigning said lower-numbered /58 prefix delegation quarter to prefix delegation associated with wired local area networks; and
assigning said higher-numbered /58 prefix delegation quarter to prefix delegation associated with wireless local area networks.

9. The method of claim 7, wherein said higher-numbered half comprises a /57 half that is not broken down further.

10. The method of claim 6, wherein said lower- and higher-numbered halves each comprise a /57 half that is not broken down further.

11. The method of claim 2, wherein:
said gateway device comprises a four-port Ethernet switch, a multimedia over coaxial cable interface, and a wireless interface having five service set identifiers;
said first trust zone comprises a trusted zone;
said second trust zone comprises an un-trusted zone;
said pre-categorizing comprises:
assigning said four-port Ethernet switch, said multimedia over coaxial cable interface, and a lowest numbered three of said five service set identifiers to said first trust zone; and
assigning a highest numbered two of said five service set identifiers to said second trust zone; and
said operating in accordance with said pre-categorizing step comprises allowing packets to travel from said trusted zone to said un-trusted zone but not from said un-trusted zone to said trusted zone.

12. The method of claim 2, wherein:
said pre-categorizing further comprises pre-categorizing into at least a third trust zone:
said gateway device comprises a four-port Ethernet switch, a multimedia over coaxial cable interface, and a wireless interface having five service set identifiers;
said first trust zone comprises a trusted zone;
said second and third trust zones comprise un-trusted zones;
said pre-categorizing comprises:
assigning a lowest three numbered ports of said four-port Ethernet switch, said multimedia over coaxial cable interface, and a lowest numbered three of said five service set identifiers to said first trust zone;
assigning a highest numbered two of said five service set identifiers to said second trust zone; and
assigning a highest numbered one of said ports of said four-port Ethernet switch to said third trust zone; and
said operating in accordance with said pre-categorizing step comprises allowing packets to travel from said trusted zone to either of said un-trusted zones but not from either of said un-trusted zones to said trusted zone.

13. The method of claim 2, wherein:
said pre-categorizing further comprises pre-categorizing into at least a third trust Zone;
said gateway device comprises a four-port Ethernet switch, a multimedia over coaxial cable interface, and a wireless interface having five service set identifiers;
said first and third trust zones comprise trusted zones;
said second trust zone comprise an un-trusted zone;
said pre-categorizing further comprises:
assigning a lowest three numbered ports of said four-port Ethernet switch. said multimedia over coaxial cable interface, and a lowest numbered three of said five service set identifiers to said first trust zone;
assigning a highest numbered two of said five service set identifiers to said second trust zone; and
assigning a highest numbered one of said ports of said four-port Ethernet switch to said third trust zone; and said operating in accordance with said pre-categorizing step comprises:
allowing packets to travel from either of said trusted zones to said un-trusted zone;
allowing packets to travel between said trusted zones; and
not allowing packets to travel from said un-trusted zone to either of said trusted zones.

14. The method of claim 2, wherein:
said pre-categorizing further comprises pre-categorizing into at least a third trust zone and a fourth trust zone;
said gateway device comprises a four-port Ethernet switch, a multimedia over coaxial cable interface, and a wireless interface having five service set identifiers;
said first and third trust zones comprise trusted zones;
said second and fourth trust zones comprise un-trusted zones;
said pre-categorizing further comprises:
assigning a lowest two numbered ports of said four-port Ethernet switch, said multimedia over coaxial cable interface, and a lowest numbered three of said five service set identifiers to said first trust zone;
assigning a highest numbered two of said five service set identifiers to said second trust zone;
assigning a next highest numbered one of said ports of said four-port Ethernet switch to said third trust zone; and
assigning a most highly numbered one of said ports of said four-port Ethernet switch to said fourth trust zone; and
said operating in accordance with said pre-categorizing step comprises:
allowing packets to travel from either of said trusted zones to either of said un-trusted zones;
allowing packets to travel between said trusted zones; and
not allowing packets to travel from either of said un-trusted zones to either of said trusted zones.

15. The method of claim 2, wherein said operating of said gateway device in accordance with said pre-categorizing step further comprises applying said at least first and second trust zones as policy inputs to a firewall associated with said gateway device.

16. The method of claim 1, further comprising remotely diagnosing at least one problem associated with at least one of said plurality of networks associated with said premises, based on said allocating step.

17. An article of manufacture comprising a computer program product, said computer program product comprising:
a tangible computer-readable recordable storage medium, storing in a non-transitory manner computer readable program code, the computer readable program code comprising:
computer readable program code configured to divide a delegated internet protocol version six prefix, which is assigned to a gateway device which is interposed between an internet and a premises, into a lower-numbered portion and a higher-numbered portion;
computer readable program code configured to allocate one of said lower-numbered portion and said higher-numbered portion to a plurality of networks associated with said premises;
computer readable program code configured to break another one of said lower-numbered portion and said higher-numbered portion into a plurality of blocks for use in prefix delegation for allocation to routers associated with said premises requesting said prefix delegation; and
computer readable program code configured to operate said gateway device in accordance with said dividing, allocating, and breaking.

18. The article of manufacture of claim 1, further comprising computer readable program code configured to pre-categorize at least some of said plurality of networks associated with said premises into at least first and second trust zones, wherein said computer readable program code configured to operate further comprises computer readable program code configured to operate said gateway device in accordance with said pre-categorizing.

19. An apparatus comprising:
means for dividing a delegated internet protocol version six prefix, which is assigned to a gateway device which is interposed between an internet and a premises, into a lower-numbered portion and a higher-numbered portion;
means for allocating one of said lower-numbered portion and said higher-numbered portion to a plurality of networks associated with said premises;
means for breaking another one of said lower-numbered portion and said higher-numbered portion into a plurality of blocks for use in prefix delegation for allocation to routers associated with said premises requesting said prefix delegation; and
means for operating said gateway device in accordance with said dividing, allocating, and breaking.

20. The apparatus of claim 19, further comprising means for pre-categorizing at least some of said plurality of networks associated with said premises into at least first and second trust zones, wherein said means for operating further comprise means for operating said gateway device in accordance with said pre-categorizing.

21. A gateway device for interposition between an internet and a premises, said gateway apparatus comprising:
a memory; and
at least one processor, coupled to said memory, and operative to:
divide a delegated internet protocol version six prefix, which is assigned to said gateway device, into a lower-numbered portion and a higher-numbered portion;
allocate one of said lower-numbered portion and said higher-numbered portion to a plurality of networks associated with said premises;
break another one of said lower-numbered portion and said higher-numbered portion into a plurality of blocks for use in prefix delegation for allocation to routers associated with said premises requesting said prefix delegation; and
operate said gateway device in accordance with said dividing, allocating, and breaking.

22. The gateway device of claim 21, wherein said at least one processor is further operative to pre-categorize at least some of said plurality of networks associated with said premises into at least first and second trust zones, and wherein said at least one processor is operative to operate said gateway device in accordance with said pre-categorizing.

23. The gateway device of claim 22, wherein said lower-numbered portion comprises a lower-numbered half and said higher-numbered portion comprises a higher-numbered half.

24. The gateway device of claim 23, wherein:
said lower-numbered half is allocated to said plurality of networks associated with said premises; and said higher-numbered half is broken into said plurality of blocks for use in said prefix delegation.

25. The gateway device of claim 22, further comprising:
a wired network switch, coupled to said memory and said at least one processor;
a multimedia over coaxial cable interface, coupled to said memory and said at least one processor; and
a wireless interface having a plurality of set identifiers, coupled to said memory and said at least one processor;
wherein:
 said first trust zone comprises a trusted zone;
 said second trust zone comprises an un-trusted zone;
 said pre-categorizing comprises:
  assigning said wired network switch, said multimedia over coaxial cable interface, and a first portion of said service set identifiers to said first trust zone; and
  assigning a second portion of said service set identifiers to said second trust zone; and
 said operating in accordance with said pre-categorizing comprises allowing packets to travel from said trusted zone to said un-trusted zone but not from said un-trusted zone to said trusted zone.

\* \* \* \* \*